(12) United States Patent
Wu

(10) Patent No.: US 11,644,434 B2
(45) Date of Patent: May 9, 2023

(54) BIOSENSOR SYSTEM ANALYTE MEASUREMENT

(71) Applicant: Ascensia Diabetes Care Holdings AG, Basel (CH)

(72) Inventor: Huan-Ping Wu, Granger, IN (US)

(73) Assignee: Ascensia Diabetes Care Holdings AG, Basel (CH)

( * ) Notice: Subject to any disclaimer, the term of this patent is extended or adjusted under 35 U.S.C. 154(b) by 828 days.

(21) Appl. No.: 15/573,737

(22) PCT Filed: May 13, 2016

(86) PCT No.: PCT/IB2016/052800
§ 371 (c)(1),
(2) Date: Nov. 13, 2017

(87) PCT Pub. No.: WO2016/185352
PCT Pub. Date: Nov. 24, 2016

(65) Prior Publication Data
US 2018/0188199 A1   Jul. 5, 2018

Related U.S. Application Data

(60) Provisional application No. 62/162,298, filed on May 15, 2015.

(51) Int. Cl.
*G01N 27/327*   (2006.01)
(52) U.S. Cl.
CPC ..... *G01N 27/3274* (2013.01); *G01N 27/3272* (2013.01); *G01N 27/3275* (2013.01)

(58) Field of Classification Search
CPC .......... C12Q 1/00; C12Q 1/001; C12Q 1/004; C12Q 1/005; C12Q 1/006;
(Continued)

(56) References Cited

U.S. PATENT DOCUMENTS 8,721,851 B2   5/2014   Uchiyama
9,658,182 B2   5/2017   Uchiyama
(Continued)

FOREIGN PATENT DOCUMENTS

CA   2742149 A1   6/2010
CA   2742149 C    7/2016
(Continued)

OTHER PUBLICATIONS

International Preliminary Report on Patentability for Application No. PCT/IB2016/052800, (9 pages).
(Continued)

*Primary Examiner* — Maris R Kessel
(74) *Attorney, Agent, or Firm* — Erise IP, P.A.

(57) ABSTRACT

Methods and biosensor systems for compensating an analyte measurement are provided. The methods and systems determine a secondary output signal based on the measured primary output signal in order to better approximate the effects of an extraneous stimulus on the primary output signal under actual measurement conditions. The methods and systems according to the present disclosure may provide a more accurate analyte measurement, and may be particularly useful in detecting and compensating an analyte measurement during an off-condition.

11 Claims, 18 Drawing Sheets

(58) Field of Classification Search
CPC ........ C12Q 1/26–32; C12Q 1/34; C12Q 1/54;
G01N 27/48; G01N 27/26; G01N
27/327–3274; G01N 33/487; G01N
33/49; A61B 5/14532; A61B 5/14535;
A61B 5/14536; A61B 5/1468–14865
See application file for complete search history.

(56) References Cited

U.S. PATENT DOCUMENTS

| | | | | |
|---|---|---|---|---|
| 2008/0248581 | A1* | 10/2008 | Chu | ............... G01N 33/721 |
| | | | | 436/66 |
| 2009/0177406 | A1* | 7/2009 | Wu | ............... G01N 27/3273 |
| | | | | 702/19 |
| 2011/0203942 | A1 | 8/2011 | Uchiyama | |
| 2011/0301857 | A1* | 12/2011 | Huang | ............... G01N 33/48714 |
| | | | | 702/19 |
| 2012/0261257 | A1* | 10/2012 | Vanjari | ............... G01N 27/3272 |
| | | | | 564/252 |

FOREIGN PATENT DOCUMENTS

| | | |
|---|---|---|
| CN | 102209893 A | 10/2011 |
| CN | 102209893 B | 6/2013 |
| EP | 2372356 A1 | 10/2011 |
| EP | 2372356 B1 | 1/2018 |
| EP | 3301439 A1 | 4/2018 |
| GB | 2 512 842 A | 10/2014 |
| JP | 2010-061629 A | 3/2010 |
| JP | 2012-168203 A | 9/2012 |
| JP | 5092021 B2 | 12/2012 |
| JP | 2013-029516 A | 2/2013 |
| JP | 5270780 B2 | 8/2013 |
| JP | 5358014 B2 | 12/2013 |
| KR | 2011-0074776 A | 7/2011 |
| KR | 101346441 B1 | 1/2014 |
| WO | WO 2007/100651 A1 | 9/2007 |
| WO | WO-2007100651 A * 9/2007 ......... A61B 5/14532 |
| WO | WO 2010/061629 A1 | 6/2010 |
| WO | WO 2012/059743 A2 | 5/2012 |
| WO | WO 2014/159077 A1 | 10/2014 |

OTHER PUBLICATIONS

Japanese Office Action in Japanese Patent Application No. JP 2017-559516 dated Feb. 4, 2020 (4 pages).

* cited by examiner

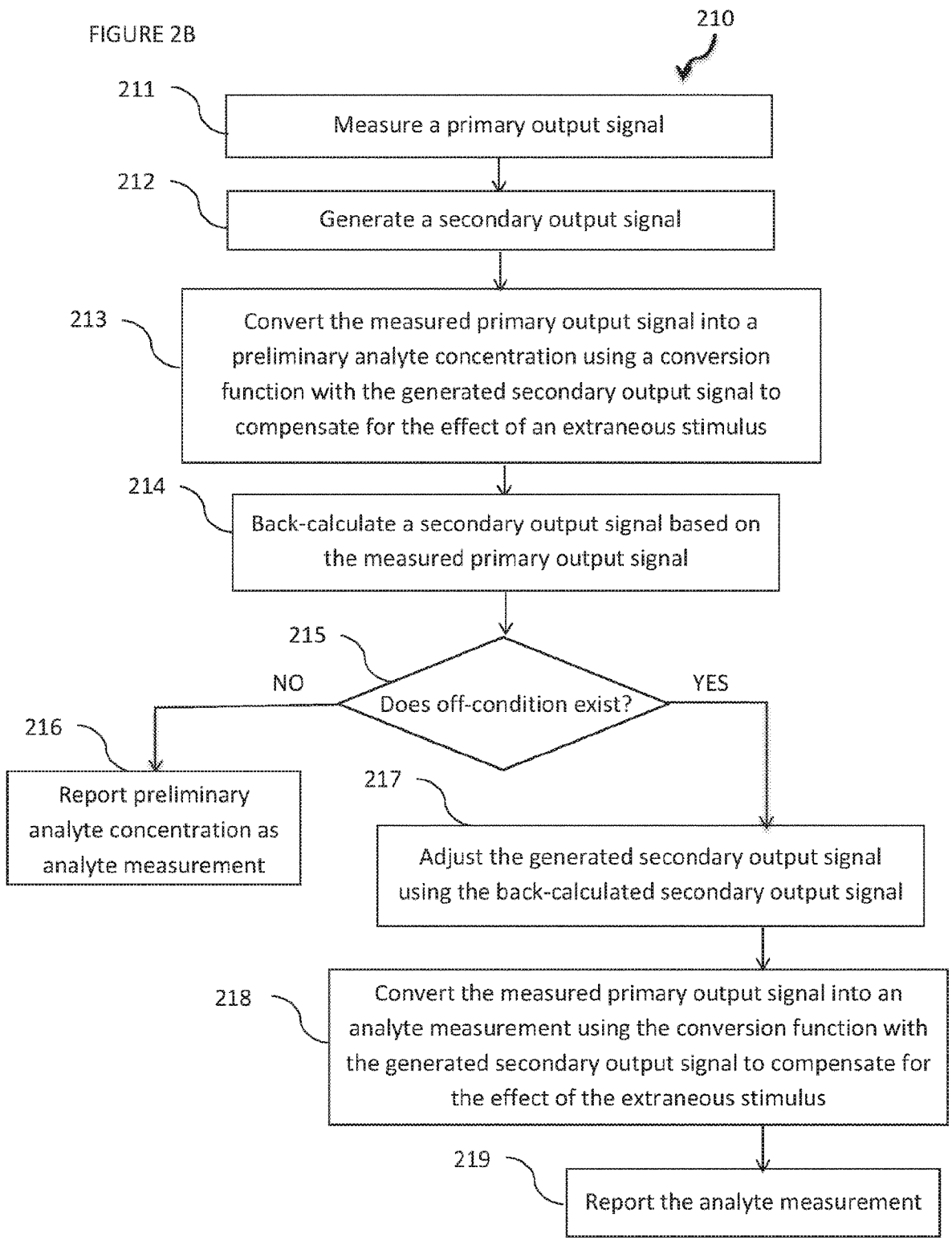

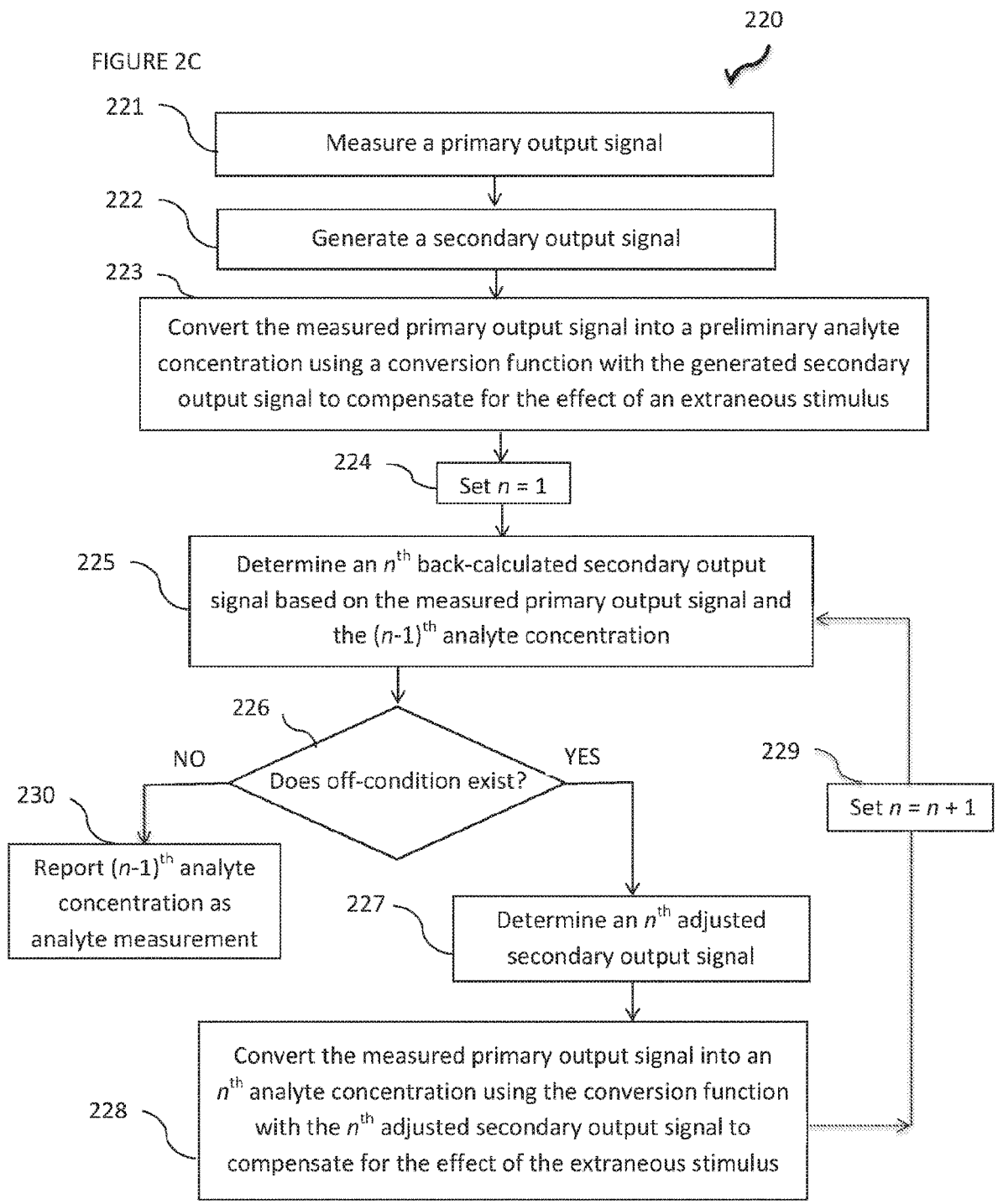

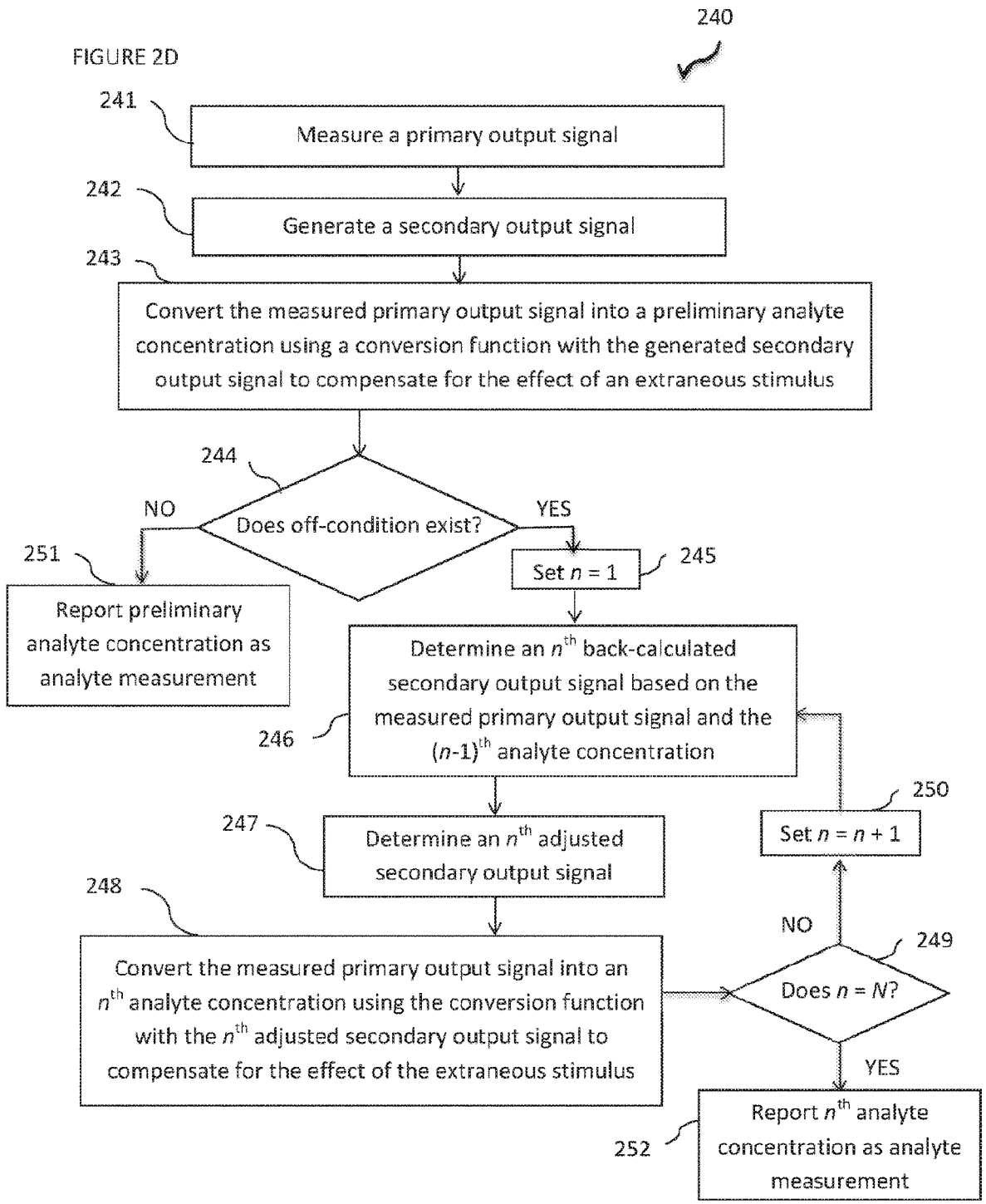

| Estimated accuracy of back-calculated temperatures | | |
|---|---|---|
| | $\Delta T = T_{calc} - T_{meas}$ | |
| | Eq. (4) (♦) | Eq. (5) (□) |
| Mean, °C | 0.0 | 0.0 |
| SD, °C | 2.4 | 1.3 |

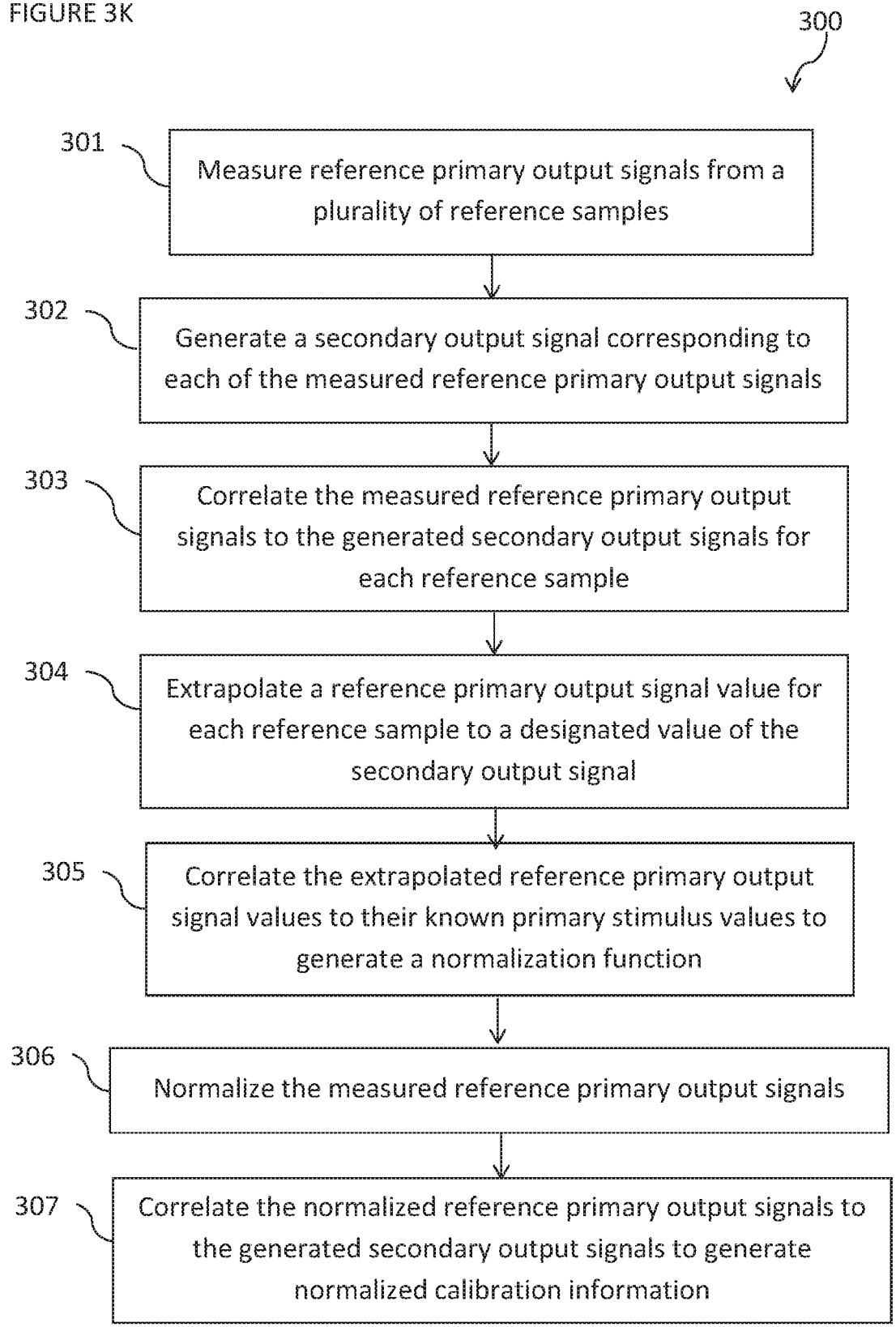

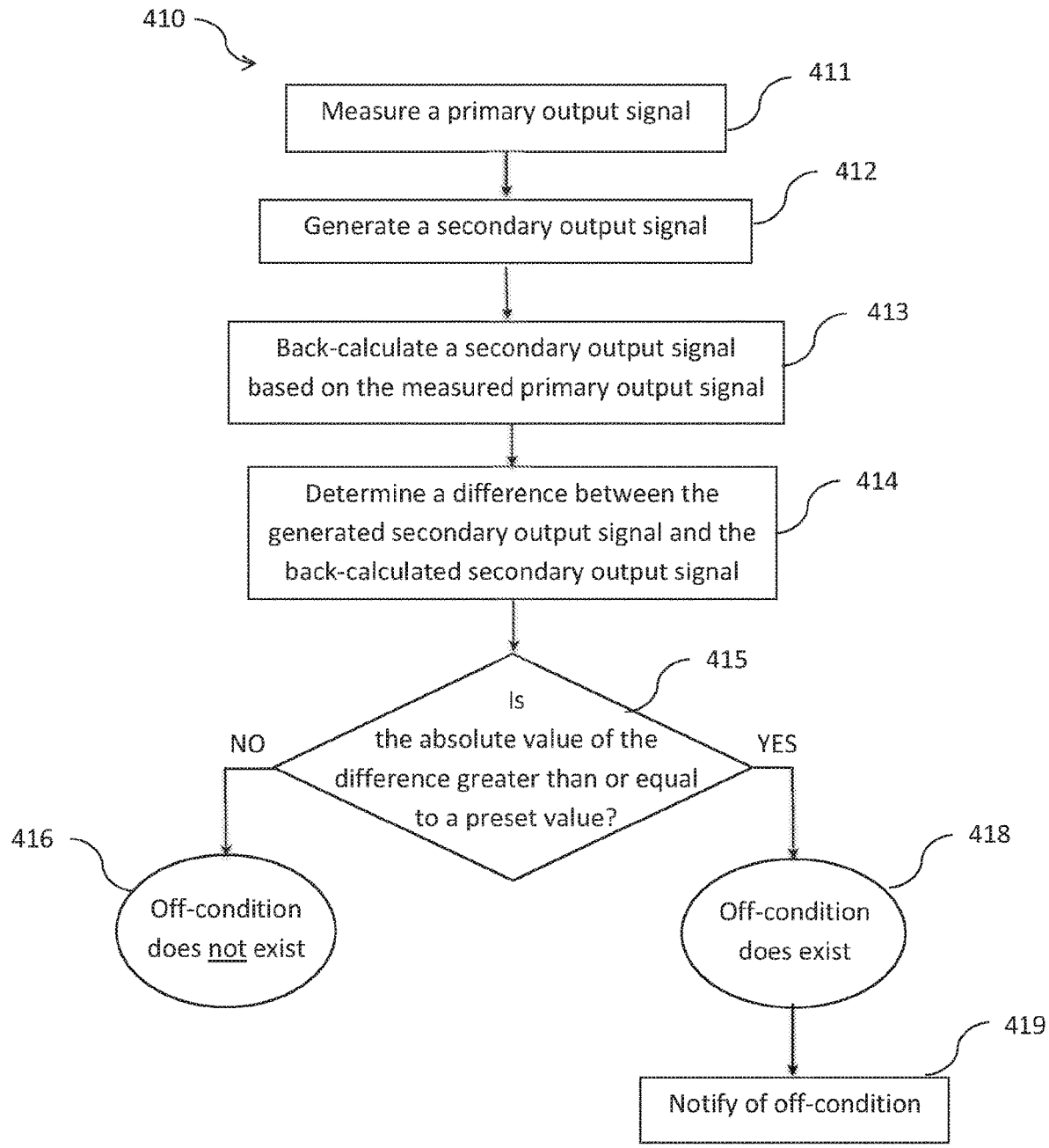

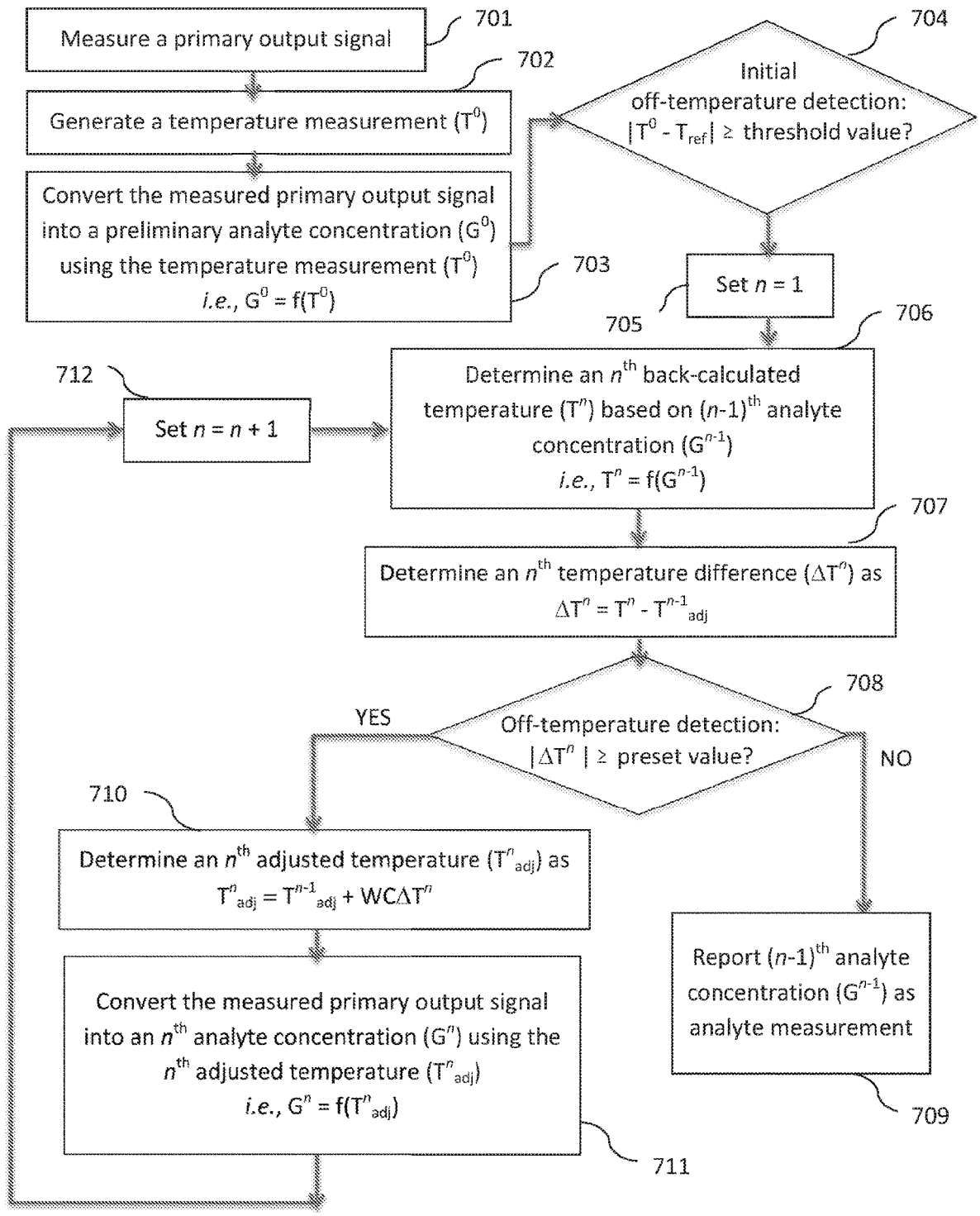

BIOSENSOR SYSTEM ANALYTE MEASUREMENT

CROSS-REFERENCE TO RELATED APPLICATIONS

This application is a U.S. national stage of International Application No. PCT/M2016/052800, titled "Improved Biosensor System Analyte Measurement," and filed May 13, 2016, which claims the benefit of and priority to U.S. Provisional Patent Application Ser. No. 62/162,298, filed on May 15, 2015, the contents of which are both herein incorporated by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Bayer Healthcare 2015, All Rights Reserved.

BACKGROUND

Biosensor systems provide an analysis of a biological fluid sample, such as blood, serum, plasma, urine, saliva, interstitial, or intracellular fluid. Typically, the systems include a measurement device (also referred to as a meter) that analyzes a sample residing in a test sensor (also referred to as a test strip or a sensor strip). The sample usually is a biological fluid, though may be a derivative, such as an extract, a dilution, a filtrate, or a reconstituted precipitate (as used from here on in, the term "biological fluid" includes derivatives thereof). The analysis performed by the biosensor system may determine the presence and/or concentration of one or more analytes, such as alcohol, glucose, uric acid, lactate, cholesterol, bilirubin, free fatty acids, triglycerides, proteins, ketones, phenylalanine or enzymes, in the biological fluid, which may be useful in the diagnosis and/or treatment of certain conditions.

For example, a person with diabetes may use a biosensor system to determine the A1c (glycated hemoglobin) or glucose level in blood for adjustments to diet and/or medication. In blood samples that include hemoglobin (Hb), the presence and/or concentration of total hemoglobin (THb) and A1c may be determined. A1c level (%-A1c) is a reflection of the state of glucose control in a patient, providing insight into the average glucose control over the two to three months preceding the test. For diabetic individuals, an accurate measurement of %-A1c provides a better indication of how well the individual is controlling blood glucose levels with diet and/or medication over a longer term than an instantaneous measure of blood glucose level, which only indicates blood glucose control at the time the measurement is made.

Biosensor systems may be designed to analyze one or more analytes and may use different volumes of biological fluids. Some systems may analyze a single drop of blood, such as in a range of 0.25-15 microliters (µL) in volume. Biosensor systems may be implemented using bench-top, portable, and other types of measurement devices. Portable measurement devices may be hand-held and allow for the identification and/or quantification of one or more analytes in a sample. Examples of portable measurement systems include the Contour® meters of Bayer HealthCare (Whippany, N.J.), while examples of bench-top measurement systems include the Electrochemical Workstation available from CH Instruments in Austin, Tex., and the bench-top model "YSI 2300 STAT Plus™ Glucose & Lactate Analyzer," and related models from the Yellow Springs Instrument Company, now known as YSI Inc. (referred to herein as "YSI" reference values).

In many biosensor systems, the test sensor may be adapted for use outside, inside, or partially inside a living organism. When used outside a living organism, a sample of the biological fluid may be introduced into a sample reservoir in the test sensor, and the test sensor may be placed in the measurement device before, after, or during the introduction of the sample for analysis. When inside or partially inside a living organism, the test sensor may be continually immersed in the sample, or the sample continuously flowed through the test sensor, such as for continuous monitoring; or the sample may be intermittently introduced to or flowed through the test sensor, such as for intermittent monitoring. The test sensor may include a reservoir that partially isolates a volume of the sample or be open to the sample. When open, the test sensor may take the form of a fiber or other structure placed in contact with the biological fluid.

Biosensor systems typically provide one or more primary input signals (collectively referred to as the primary input signal) to a sample of biological fluid, and measure one or more primary output signals (collectively referred to as the primary output signal) generated from the sample to determine the analyte concentration. The primary output signal is generated as a result of an interaction between the primary input signal and the analyte, or between the primary input signal and a species indicative of the analyte, and is typically correlated with the analyte concentration. Biosensor systems may use optical and/or electrochemical methods to analyze the biological fluid.

In optical systems, the primary input signal is typically a light beam generated from a light source, giving rise to a measurement of a sample's transmittance or reflectance of the light beam. In some optical systems, the analyte or species indicative of the analyte may absorb or shift the wavelength of the incident light beam (primary input signal), so that the resulting primary (light) output signal has reduced intensity or is wavelength-shifted with respect to the primary input signal. In other optical systems, a chemical indicator may fluoresce or emit light in response to the analyte when illuminated by a primary (light) input signal). In either optical system, the measured primary (light) output signal) may be converted into an electrical output signal, such as current or potential, and the system measures the primary (light) output signal and correlates the primary output signal with the analyte concentration of the sample.

In electrochemical systems, the analyte concentration of the sample is determined from an electrical signal generated by a redox reaction of the analyte or of a measurable species responsive to the analyte concentration when a primary (electrical) input signal is applied to the sample. The primary input signal may be a potential or current and may be constant, variable, or a combination thereof such as when an AC signal is applied with a DC signal offset. The primary input signal may be applied as a single pulse or in multiple pulses, sequences, or cycles. An enzyme or similar species may be added to the sample to enhance the electron transfer from the analyte during the redox reaction. The enzyme or similar species may react with a single analyte, thus providing specificity to a portion of the generated output signal. A redox mediator may be used as the measurable species to maintain the oxidation state of the enzyme and/or assist with electron transfer from the analyte to an electrode. Thus, during the redox reaction, an enzyme or similar species may transfer electrons between the analyte and the redox mediator, while the redox mediator transfers electrons between itself and an electrode of the test sensor.

The measurement device of an electrochemical biosensor system applies a primary input signal through the electrical contacts to the electrical conductors of the test sensor. The electrical conductors convey the primary input signal through the electrodes into the sample present in the sample reservoir. The redox reaction of the analyte generates a primary (electrical) output signal in response to the primary input signal. The primary (electrical) output signal from the test sensor may be a current (as generated by amperometry or voltammetry), a potential (as generated by potentiometry/galvanometry), or an accumulated charge (as generated by coulometry). The measurement device may have the processing capability to measure and correlate the primary output signal with the presence and/or concentration of one or more analytes in the sample.

In either optical or electrochemical biosensor systems, the conversion of the primary output signal to indicate the presence and/or concentration of the target analyte(s) is typically accomplished using a conversion function. A conversion function is a calculation method that converts the primary output signal to a concentration of the target analyte(s). For example, a conversion function may involve using a reference correlation between the primary output signal and the analyte concentration with a linear, nonlinear, or polynomial relationship. The conversion function reflects a correlation under a set of assumptions regarding the conditions of the testing and sample, and deviations from these assumptions may introduce error in the calculated analyte concentration.

The generation and measurement of the primary output signal is designed to be primarily responsive to the analyte(s) concentration that is the target or objective of the biosensor measurement, but the measured primary output signal inevitably also includes contributions from extraneous stimuli, such as deviations from the assumptions underlying the correlation. Such extraneous stimuli include those arising from physical or environmental characteristics of the sample, such as interfering substances (e.g., hematocrit (Hct), acetaminophen, lipids, proteins, ascorbic acid, uric acid, etc.), ambient temperature, humidity, and the like; operating conditions of the system, such as underfill conditions when the sample size is insufficient for the system to carry out a measurement, intermittent electrical contact between the sample and one or more electrodes in the test sensor, degradation of the reagents, and the like; and manufacturing variations between test sensor lots, such as changes in the amount and/or activity of the reagents, changes in the electrode area and/or spacing, and the like; etc.

Extraneous stimuli affect both the accuracy and precision of the measurement and analysis of the target analyte(s). Such erroneous measurements can cause frustration for the biosensor system's end user, who may need to discard test sensors and provide additional samples in order to repeat measurements, and who also may face uncertain treatment choices because of the inaccurate information. Thus, there has been an ongoing need to quantify and offset the effects of extraneous stimuli in order to remove or minimize those effects from the target analyte concentration.

When an extraneous stimulus arises from the physical or environmental characteristics of the sample, its effect may be quantified from a secondary output signal that is either extracted from the primary output signal, or measured by dedicated means or a dedicated detection channel. For example, in electrochemical systems, a secondary output signal due to an interfering substance (such as Hct) may be extracted from the primary output signals (such as, for example, the current ratios of R4/3, R5/4 and R6/5 disclosed in PCT Publication No. WO 2009/108239 entitled, "Slope-Based Compensation" and the potential sequence of gated amperometry with a Hct pulse disclosed in PCT Publication No. WO 2011/156152 A1 entitled, "Slope-Based Compensation Including Secondary Output Signals") used to determine the target analyte concentration of the sample, or measured using a dedicated electrode that may include the same reagent composition as the electrodes used to determine the target analyte concentration of the sample, a different reagent composition (e.g., one that reacts with the interferent), or no reagent composition. In optical systems, for example, a secondary output signal due to an interfering substance (such as THb) may be measured using a dedicated optical channel focused at a wavelength or an angle indicative of the interfering substance (such as, for example, the reflectance measurements disclosed in PCT Publication No. WO 2013/043839 A1 entitled "Analysis Compensation Including Segmented Signals" and PCT Publication No. WO 2014/159077 A1 entitled "Normalized Calibration of Analyte Concentration Determination"). In some instances, the secondary output signal may be correlated with a value for the extraneous stimulus; for example, a temperature sensor incorporated into a biosensor system may measure a secondary output signal due to temperature and correlate that secondary output signal with a temperature value, thus providing a separate measurement of the ambient temperature of the sample.

As used herein, the term "secondary output signal" may describe the raw signal extracted from the primary output signal or measured by a dedicated sensor, electrode, detection channel or the like, or may describe the extraneous stimulus value correlated with the raw signal, depending on the context of the particular measurement or calculation being done.

The conversion function used to convert the primary output signal to analyte concentration may utilize the secondary output signals to compensate for the effects of those extraneous stimuli. For example, the measured temperature value may be used to compensate the primary output signal to more accurately determine the analyte concentration, as discussed, for example, in U.S. Pat. No. 7,781,222 ("Temperature-Adjusted Analyte Determination for Biosensor System"). In another example, the conversion function may involve a multivariable regression with secondary output signals, as discussed, for example, in U.S. Pat. No. 8,744,776 ("Method of Determining Analyte Concentration Based on Complex Index Functions") and PCT Publication No. WO 2011/119533 A1 ("Residual Compensation for a Biosensor"). Normalization may also be used to remove or minimize the effect of extraneous stimuli from the primary output signal, as discussed, for example, in PCT Publication No. WO 2014/159077 A1 ("Normalized Calibration of Analyte Concentration Determinations").

While incorporating such compensation methods into conversion functions can improve biosensor system measurement performance, shortcomings remain. Such compensation methods are typically developed and implemented in a laboratory, where error conditions can be reproduced in a controlled environment. For portable measurement devices, particularly hand-held devices used by most consumers, such a controlled laboratory environment may not accurately reflect the conditions under which the measurements are made, so the compensation methods developed under controlled laboratory conditions may not accurately compensate for the effects of the extraneous stimuli on the primary output signal under actual measurement conditions. For example, the temperature measured by a temperature sensor incorporated in a biosensor system is assumed to reflect the temperature of the biological fluid sample, but that assumption may fail under certain operating conditions, such as when a hand-held measuring device is kept in a car during winter weather (e.g., 0°-10° C.) or summer weather (e.g., 40°-45° C.) and then used immediately with a test sensor that had been kept indoors at room temperature (e.g., 22°-25° C.). In another example, a Hct signal measurement may itself be erroneous due, for example, to a failure of a dedicated electrode.

Such a situation, where the secondary output signal does not match the reference value assumed by the compensation method and/or does not match the secondary output signal expected from the primary output signal, is referred to as an "off-condition." When an analyte determination is made under an off-condition, using the generated secondary output signal to compensate the primary output signal may introduce additional error into the analyte determination. Currently-available biosensor systems and methods cannot determine when such an off-condition occurs and so cannot determine when the conversion function requires additional adjustment to compensate for such errors due to the secondary output signals.

The methods and systems disclosed herein avoid or ameliorate at least some of these disadvantages in the prior art.

SUMMARY

In one aspect, the present disclosure provides a method of determining an analyte concentration in a biological fluid sample. A primary output signal that is primarily responsive to the analyte concentration is measured, and a secondary output signal that is responsive to an extraneous stimulus that affects the primary output signal is generated. A secondary output signal is back-calculated based on the measured primary output signal, and the generated secondary output signal is adjusted using the back-calculated secondary output signal. The measured primary output signal is converted to an analyte concentration using a conversion function with the adjusted secondary output signal used to compensate for the effect of the extraneous stimulus on the measured output signal.

In another aspect, the present disclosure provides a method of compensating an analyte measurement in an off-condition by measuring a primary output signal that is primarily responsive to the analyte concentration in a biological fluid sample and generating a secondary output signal that is responsive to an extraneous stimulus that affects the primary output signal. The measured primary output signal is converted to a preliminary analyte concentration using a conversion function with the generated secondary output signal to compensate for the effect of the extraneous stimulus on the measured primary output signal. A first back-calculated secondary output signal is determined based on the measured primary output signal and the preliminary analyte concentration. If an off-condition is determined to exist, then a first adjusted secondary output signal is determined using the first back-calculated secondary output signal to adjust the generated secondary output signal. The measured primary output signal is converted to a first analyte concentration value using the conversion function with the first adjusted secondary output signal to compensate for the effect of the extraneous stimulus on the primary output signal. In some implementations, a second back-calculated secondary output signal is determined based on the measured primary output signal and the first analyte concentration value; if an off-condition is determined to exist based on the first and second back-calculated secondary output signals, then a second adjusted secondary output signal is determined using the second back-calculated secondary output signal to adjust the first adjusted secondary output signal, and the measured primary output signal is converted to a second analyte concentration value using the conversion function and the second adjusted secondary output signal to compensate for the effect of the extraneous stimulus on the measured primary output signal.

In another aspect, the present disclosure provides a method of compensating an analyte measurement in an off-temperature condition by measuring a primary output signal and generating a temperature measurement using a temperature sensor. The measured primary output signal is converted into a preliminary analyte concentration using a conversion function with the temperature measurement to compensate for the effect of temperature on the measured primary output signal. A first back-calculated temperature is determined from the measured primary output signal and the preliminary analyte concentration. If an off-temperature condition is determined to exist, then the temperature measurement is adjusted using the first back-calculated temperature, and the measured primary output signal converted into a first analyte concentration using the conversion function with the first adjusted temperature to adjust for the effect of the temperature on the measured primary output signal.

In another aspect, the present disclosure provides a biosensor system for implementing one or more of the methods disclosed herein.

BRIEF DESCRIPTION OF THE DRAWINGS

FIG. 2B represents another embodiment of a method of determining an analyte concentration.

FIG. 2C represents another embodiment of a method of determining an analyte concentration.

FIG. 2D represents another embodiment of a method of determining an analyte concentration.

FIG. 3K illustrates one embodiment of a method of generating normalized calibration information that may be used to back-calculate a secondary output signal.

FIG. 4B represents another embodiment of a method of determining an off-condition in an analyte concentration determination.

FIG. 7A represents one embodiment of a method of compensating an analyte measurement in an off-temperature condition.

DETAILED DESCRIPTION

The present disclosure introduces a concept of back-calculating a secondary output signal based on the measured primary output signal and using the back-calculated secondary output signal to help compensate for the effect of an extraneous stimulus on the primary output signal in an analyte determination. A back-calculated secondary output signal based on the measured primary output signal better reflects the effect of the extraneous stimulus under the actual conditions under which the primary output signal was measured, and so may be used to determine when an off-condition occurs and to help compensate for the errors introduced by the off-condition, thereby improving the accuracy of the analyte concentration determination.

Figure 1A:
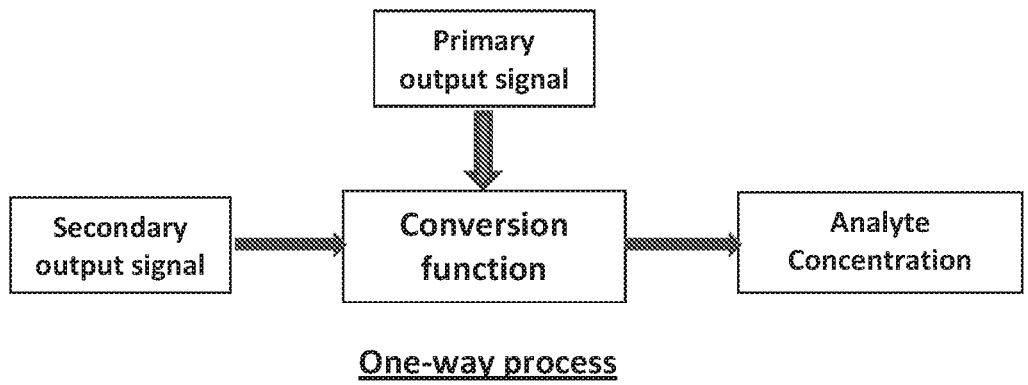
FIG. 1A illustrates a conventional (prior art) approach to compensating for the effect of an extraneous stimulus in an analyte determination.

FIG. 1A illustrates a conventional approach to compensating for the effect of an extraneous stimulus in an analyte determination. A biosensor system makes a measurement of a primary output signal. The measured primary output signal is primarily responsive to an analyte concentration in a biological fluid sample, but will include responses from extraneous stimuli (such as temperature, Hct, THb, etc.) that will affect the accuracy and precision of the analyte determination. To compensate for the effects from an extraneous stimulus, the biosensor system may generate a secondary output signal that is responsive to the extraneous stimulus, for example, by extracting the secondary output signal from the measured primary output signal, or by making a separate measurement of the secondary output signal. In a conventional compensation approach, the measured primary output signal and the generated secondary output signal are inputted into a conversion function that uses the generated secondary output signal to compensate the measured primary output signal for the effect of the extraneous stimulus while converting the measured primary output signal into an analyte concentration.

This one-way process of inputting the measured primary output signal and the generated secondary output signal into the conversion function to determine the analyte concentration, while it may be effective in reducing the effect of the extraneous stimulus in the analyte determination, fails to detect errors associated with the generated secondary output signal. Such errors may arise, for example, when the generated secondary output signal itself is in error due to a faulty detection channel, such as may occur in detecting a THb signal, or due to a failure of a dedicated electrode, such as may occur in detecting a Hct signal, or when the generated secondary output signal does not reflect the actual condition of the biological fluid sample when the primary output signal is measured, such as may occur when the measuring device's temperature sensor does not represent the temperature of the sensor/sample. When an erroneous secondary output signal is inputted into the conversion function, a large error may result when compensating the measured primary output signal for the effect of the extraneous stimulus, and so may compromise the accuracy of the analyte concentration determination.

Figure 1B:
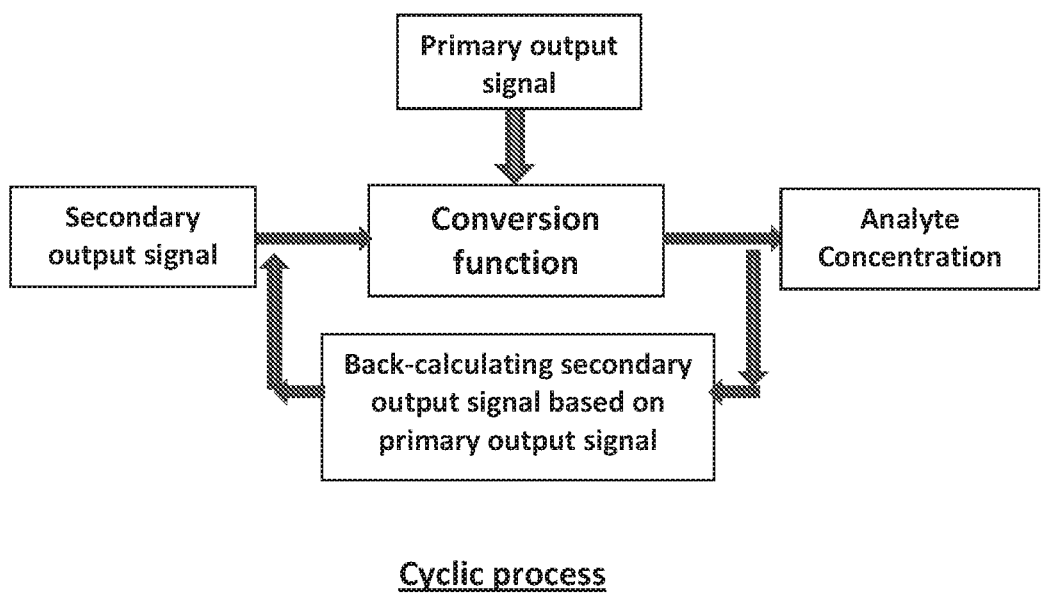
FIG. 1B illustrates a cyclic approach to compensating for the effect of an extraneous stimulus in an analyte determination.

FIG. 1B illustrates a cyclic approach, according to this present disclosure, for compensating for the effect of an extraneous stimulus in an analyte determination. In accordance to this disclosure, the cyclic process may begin as above, with a measured primary output signal and a generated secondary output signal being inputted into a conversion function to determine a preliminary analyte concentration. The process then generates a new input to cycle back into the conversion function to better compensate for the effect of the extraneous stimulus. This cyclic process involves back-calculating a secondary output signal based on the measured primary output signal using, for example, the measured primary output signal itself, the preliminary analyte concentration and/or other information derived from the measured primary output signal and/or preliminary analyte concentration. The back-calculated secondary output signal is used to adjust the generated secondary output signal by, for example, adding a portion of the back-calculated secondary output signal or a parameter that depends on the back-calculated secondary output signal to the generated secondary output signal, or replacing the generated secondary output signal with the back-calculated secondary output signal. The adjusted secondary output signal (along with the measured primary output signal) is inputted into the conversion function to determine a first compensated analyte concentration. This cyclic process may be implemented for one cycle, or multiple cycles, for example, for a predetermined number of cycles, or until certain criteria are satisfied.

It has been found that, by using the back-calculated secondary output signal to adjust the generated secondary output signal, the adjusted secondary output signal that is inputted into the conversion function better reflects the actual conditions under which the primary output signal was measured and also helps correct for errors in the generated secondary output signal. Thus, cyclic processes of the present disclosure may provide improved accuracy of analyte determinations.

FIGS. 2A-2D illustrate some steps involved in different implementations of a cyclic process according to the present disclosure.

Figure 2A:
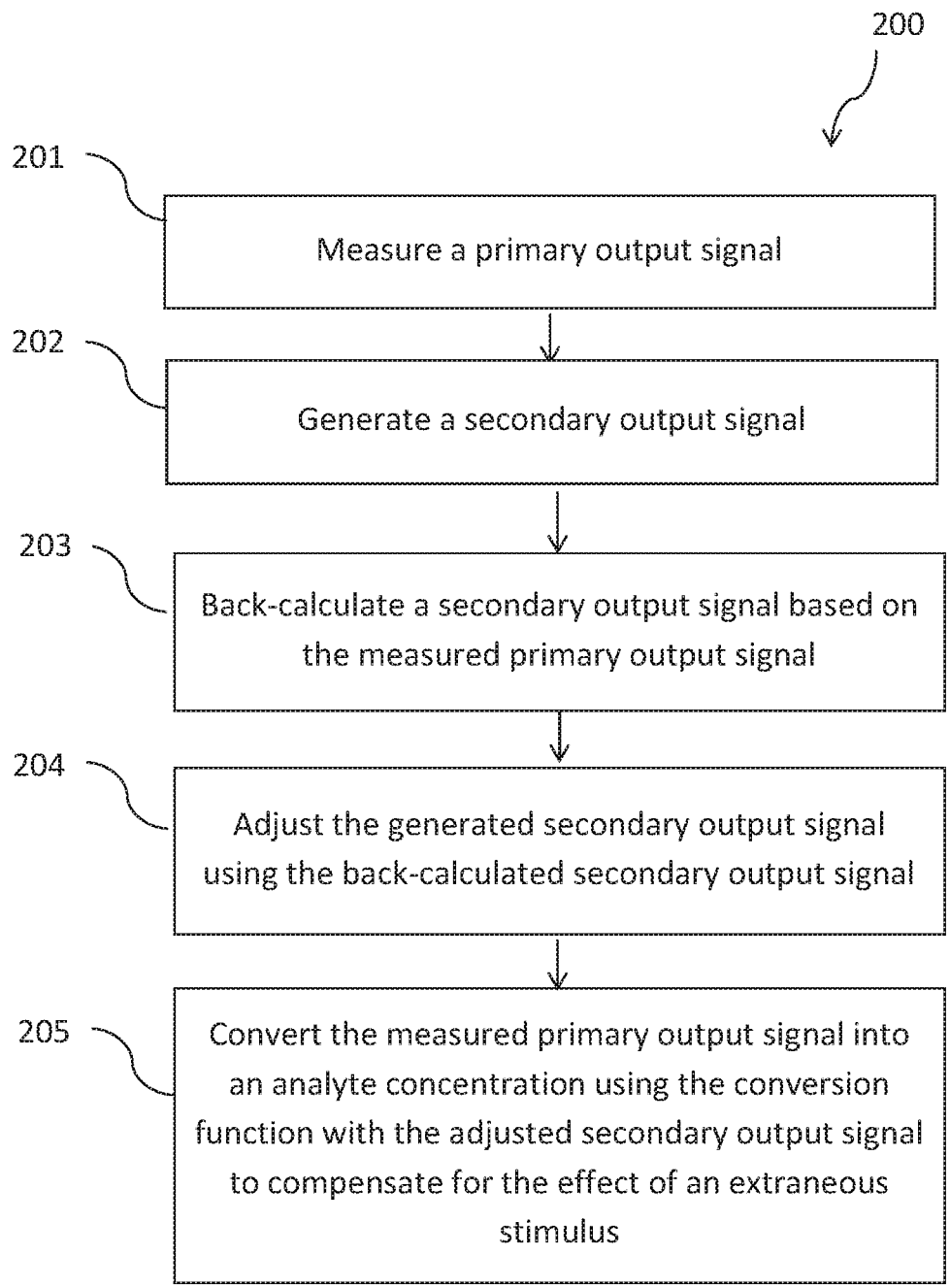
FIG. 2A represents one embodiment of a method of determining an analyte concentration.

FIG. 2A shows a flow chart 200 illustrating some steps in a one-cycle implementation of a method of determining an analyte concentration according to the present disclosure. Using a biosensor system, a primary output signal is measured at step 201. The primary output signal is designed to be primarily responsive to the analyte concentration.

At step 202, a secondary output signal is generated. The secondary output signal is responsive to an extraneous stimulus that affects the measured primary output signal and may be generated, for example, by extracting the secondary output signal from the measured primary output signal (such as, for example, extracting the current ratios of R4/3, R5/4 and R6/5 as secondary output signals responsive to Hct levels, as disclosed in PCT Publication No. WO 2009/108239 entitled, "Slope-Based Compensation," or using the potential sequence of gated amperometry with a Hct pulse, as disclosed in WO 2011/156152 A1 entitled, "Slope-Based Compensation Including Secondary Output Signals"), or by making a separate measurement of the secondary output signal using a separate sensor, a separate detection channel or electrode, or the like (such as, for example, using a temperature sensor to make a temperature measurement, or a dedicated optical channel to measure a reflectance signal responsive to THb levels, as disclosed in WO 2013/043839 A1 entitled "Analysis Compensation Including Segmented Signals" and WO 2014/159077 A1 entitled "Normalized Calibration of Analyte Concentration Determination"). Steps 201 and 202 may be performed in any order, or may occur simultaneously.

At step 203, a back-calculated secondary output signal is determined based on the measured primary output signal using the measured primary output signal itself and/or information derived from the measured primary output signal, such as a preliminary analyte concentration. Some embodiments of a method for back-calculating a secondary output signal will be shown and discussed below and with reference to FIGS. 3A-3J.

At step 204, the back-calculated secondary output signal is used to adjust the secondary output signal generated by the biosensor system. At step 205, the measured primary output signal is converted into the analyte concentration using a conversion function with the adjusted secondary output signal (from step 204) being used to compensate for the effect of the extraneous stimulus on the measured primary output signal.

FIG. 2B shows a flow chart 210 illustrating some steps in a one-cycle implementation of a method of compensating an analyte measurement in an off-condition according to the present disclosure. Using a biosensor system, a primary output signal is measured at step 211, and a secondary output signal generated at step 212. Steps 211 and 212 may be performed in any order, or may occur simultaneously. At step 213, the measured primary output signal is converted into a preliminary analyte concentration using a conversion function with the generated secondary output signal used to compensate for the effect of an extraneous stimulus on the measured primary output signal. At step 214, a back-calculated secondary output signal is determined based on the measured primary output signal, as will be discussed further below and with regard to FIGS. 3A-3J. Step 215 queries whether an off-condition exists. An "off-condition" may occur when the generated secondary output signal does not match the reference value assumed by a compensation method incorporated into the conversion function and/or does not match the secondary output signal expected based on the measured primary output signal; some embodiments of a method for determining whether an off-condition exists will be shown and discussed below, with reference to FIGS. 4A and 4B.

If an off-condition is determined to not exist (i.e., the answer to the query of 215 is "NO"), then additional or further compensation for the effect of the extraneous stimulus may not be needed or desired, so at step 216, the preliminary analyte concentration may be reported by the biosensor system as the analyte measurement.

If an off-condition is determined to exist (i.e., the answer to the query of 215 is "YES"), then additional compensation for the effect of the extraneous stimulus may be needed or desired, so, at step 217, the generated secondary output signal is adjusted using the back-calculated secondary output signal. In some implementations, the generated secondary output signal may be replaced by the back-calculated secondary output signal; in other words, the adjusted secondary output signal may be equated to the back-calculated secondary output signal. In other implementations, a portion of the back-calculated secondary output signal may be used to adjust the generated secondary output signal. In still other implementations, a portion of the difference between the back-calculated secondary output signal and the generated secondary output signal may be added to the generated secondary output signal to adjust it. At step 218, the measured primary output signal is converted into the analyte measurement using the conversion function with the adjusted secondary output signal to compensate for the effect of the extraneous stimulus, and the analyte measurement reported in step 219.

FIG. 2C shows a flow chart 220 that illustrates some steps in a multiple cycle implementation of a method of compensating an analyte measurement in an off-condition according to the present disclosure. In the implementation shown in flow chart 220, cyclic compensation is repeated until an off-condition no longer exists.

Using a biosensor system, a primary output signal is measured at step 221, and a secondary output signal generated at step 222. Steps 221 and 222 may be performed in any order, or may occur simultaneously. At step 223, the measured primary output signal is converted into a preliminary analyte concentration using a conversion function with the generated secondary output signal used to compensate for the effect of an extraneous stimulus on the measured primary output signal.

A counter, n, may be used to keep track of the number of cycles used, and at step 224, n is set to 1. A cycle begins at step 225, where an $n^{th}$ back-calculated secondary output signal is determined based on the measured primary output signal and the $(n-1)^{th}$ analyte concentration, as will be discussed further below and with regard to FIGS. 3A-3J; for n=1, the $(n-1)^{th}$ analyte concentration is the preliminary analyte concentration that was determined in step 223. Step 226 queries whether an off-condition exists; some embodiments of a method for determining whether an off-condition exists will be shown and discussed below, with reference to FIGS. 4A and 4B.

If the query of 226 returns "NO", then the $(n-1)^{th}$ analyte concentration is reported as the analyte measurement, as shown at step 230.

If the query of 226 returns "YES", then, at step 227, an $n^{th}$ adjusted secondary output signal is determined by, for example, using the $n^{th}$ back-calculated secondary output signal to adjust the $(n-1)^{th}$ adjusted secondary output signal; for n=1, the $(n-1)^{th}$ adjusted secondary output signal is the generated secondary output signal from step 222. In some implementations, the $n^{th}$ back-calculated secondary output signal may be used to replace the $(n-1)^{th}$ adjusted secondary output signal; in other words, the $n^{th}$ adjusted secondary output signal may be equated to the $n^{th}$ back-calculated secondary output signal. In other implementations, a portion of the $n^{th}$ back-calculated secondary output signal may be used to adjust the $(n-1)^{th}$ generated secondary output signal. In still other implementations, a portion of the difference between the $n^{th}$ back-calculated secondary output signal and the $(n-1)^{th}$ adjusted secondary output signal may be added to the $(n-1)^{th}$ adjusted secondary output signal to determine the $n^{th}$ adjusted secondary output signal.

At step 228, the measured primary output signal is converted to an $n^{th}$ analyte concentration using the conversion function with the $n^{th}$ adjusted secondary output signal to compensate for the effect of the extraneous stimulus.

At step 229, the counter, n, is increased by one, i.e., n=n+1, and another cycle begins at step 225. The cycle (steps 225-229) is repeated until the off-condition no longer exists (i.e., the query of 226 returns "NO"), at which point the $(n-1)^{th}$ analyte concentration is reported as the analyte measurement (step 230).

FIG. 2D shows a flow chart 240 that illustrates some steps in another multiple cycle implementation of a method of compensating an analyte measurement in an off-condition according to the present disclosure. In the implementation shown in flow chart 240, cyclic compensation is repeated for a pre-determined (fixed) number of cycles.

Using a biosensor system, a primary output signal is measured at step 241, and a secondary output signal generated at step 242. Steps 241 and 242 may be performed in any order, or may occur simultaneously. At step 243, the measured primary output signal is converted into a preliminary analyte concentration using a conversion function with the generated secondary output signal used to compensate for the effect of an extraneous stimulus on the measured primary output signal.

Step 244 queries whether an off-condition exists; some embodiments of a method for determining whether an off-condition exists will be shown and discussed below, with reference to FIGS. 4A and 4B.

If the query of 244 returns "NO", then the preliminary analyte concentration is reported as the analyte measurement, as shown at step 251.

If the query of 244 returns "YES", then cyclic compensation is performed. A counter, n, may be used to keep track of the number of cycles used, and at step 245, n is set to 1. A cycle begins at step 246, where an $n^{th}$ back-calculated secondary output signal is determined based on the measured primary output signal and the $(n-1)^{th}$ analyte concentration, as will be discussed further below and with regard to FIGS. 3A-3J; for n=1, the $(n-1)^{th}$ analyte concentration is the preliminary analyte concentration that was determined in step 243.

At step 247, an $n^{th}$ adjusted secondary output signal is determined by, for example, using the $n^{th}$ back-calculated secondary output signal to adjust the $(n-1)^{th}$ adjusted secondary output signal; for n=1, the $(n-1)^{th}$ adjusted secondary output signal is the generated secondary output signal from step 242. In some implementations, the $n^{th}$ back-calculated secondary output signal may be used to replace the $(n-1)^{th}$ adjusted secondary output signal; in other words, the $n^{th}$ adjusted secondary output signal may be equated to the $n^{th}$ back-calculated secondary output signal. In other implementations, a portion of the $n^{th}$ back-calculated secondary output signal may be used to adjust the $(n-1)^{th}$ generated secondary output signal. In still other implementations, a portion of the difference between the $n^{th}$ back-calculated secondary output signal and the $(n-1)^{th}$ adjusted secondary output signal may be added to the $(n-1)^{th}$ adjusted secondary output signal to determine the $n^{th}$ adjusted secondary output signal.

At step 248, the measured primary output signal is converted to an $n^{th}$ analyte concentration using the conversion function with the $n^{th}$ adjusted secondary output signal to compensate for the effect of the extraneous stimulus.

Step 249 queries whether n is equal to the pre-determined number of cycles, N. If the query of step 249 returns "YES," then the $n^{th}$ analyte concentration is reported as the analyte measurement, as shown in step 252. If the query of step 249 returns "NO", then the counter, n, is increased by one, i.e., n=n+1, at step 250, and another cycle begins at step 246. The cycle (steps 246-250) is repeated until n=N (i.e., the query of 249 returns "YES"), at which point the $n^{th}$ analyte concentration is reported as the analyte measurement (step 252).

A secondary output signal may be back-calculated from the measured primary output signal in different ways, such as using a correlation of the secondary output signal to a parameter or other information derived from the measured primary output signal. For example, temperature may be back-calculated using a correlation between temperature and the decay constant parameter from a gated amperometry measurement, as discussed, for example, in U.S. Pat. No. 8,425,757, which is hereby incorporated by reference its entirety.

Another way of back-calculating a secondary output signal uses a correlation between the secondary output signals and normalized primary output signals. As discussed above, the measured primary output signal depends on a number of variables, primarily on analyte concentration but also on extraneous stimuli such as %-Hct, THb value, temperature, etc. Normalization reduces the dependency of the primary output signal from these many variables to fewer variables, preferably to just one variable. PCT Publication No. WO 2014/159077A1, entitled "Normalized Calibration of Analyte Concentration Determinations," provides a more detailed discussion of normalization generally and is hereby incorporated by reference in its entirety.

Normalization of the primary output signal to eliminate the dependency of the primary output signal on analyte concentration so that the primary output signal becomes dependent on an extraneous stimulus only may be accomplished by various methods. For example, the primary output signal may be normalized by dividing the primary output signal by a unity function value of the analyte concentration; alternatively, a normalization function may be generated, and a ratio of the primary output signal to the normalization function value used as the normalized primary output signal.

FIGS. 3A-3J illustrate some ways to generate a normalization function and a normalized primary output signal that has had its dependency on analyte concentration eliminated and is dependent only on a secondary output signal. Back-calculating the secondary output signal may be accomplished using a correlation between the secondary output signal and normalized primary output signal. FIG. 3K shows a flowchart that summarizes some steps illustrated in FIGS. 3A-3I for generating a normalization function and normalized calibration information that may be used to back-calculate a secondary output signal.

FIGS. 3A-3D illustrate some aspects of normalization as applied to normalize a primary output signal that is primarily responsive to glucose concentration to be dependent on temperature only.

Figure 3A:
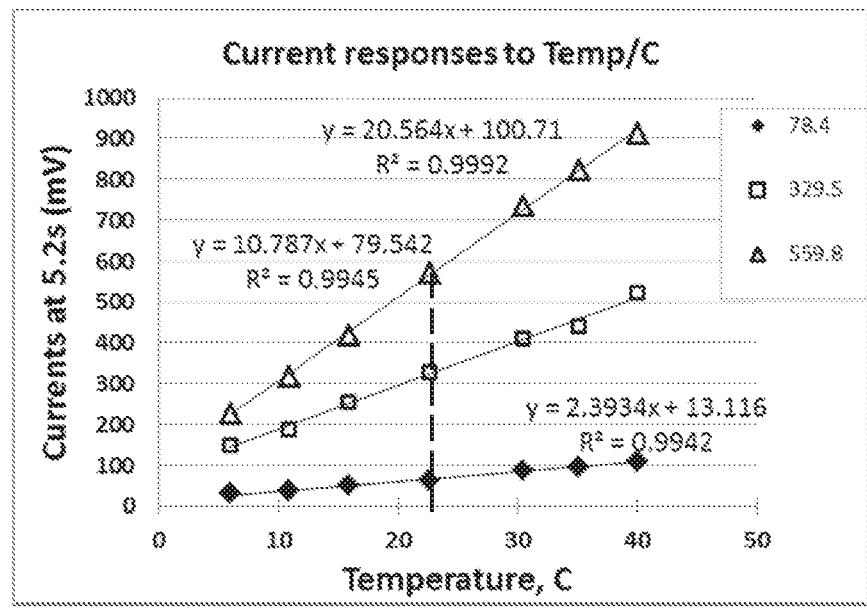
FIG. 3A shows a graph of primary output signal versus meter temperature for three YSI reference glucose samples.

FIG. 3A shows a plot of glucose signal (the primary output signal in this example) as a function of temperature (the secondary output signal in this example) at three glucose concentrations. The glucose signals (reported as the ending current at 5.2 seconds in a gated amperometry potential sequence, "Currents at 5.2 s (mV)") were measured from YSI glucose reference samples (glucose level of 78.4 mg/dL (◆), 329.5 mg/dL (□), and 559.8 mg/dL (Δ)) are plotted against the temperature as measured by the temperature sensor in the meter ("Temperature, C"). In generating the data shown in FIG. 3A, the sensor/sample temperature and the meter temperature were kept the same. A line is fitted through the plotted data for each YSI glucose reference sample, and the corresponding regression equation for each line also shown in FIG. 3A.

Figure 3B:
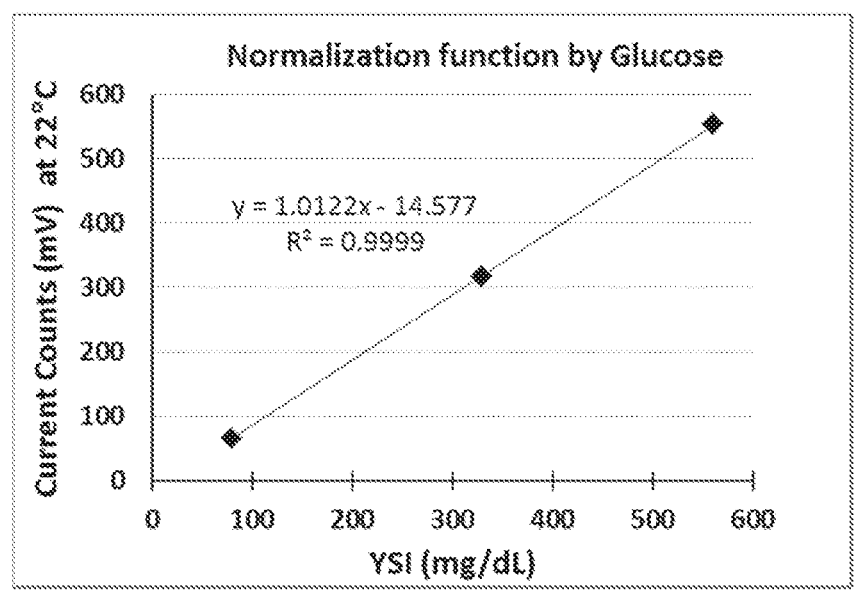
FIG. 3B shows a graph of the primary output signals extrapolated to 22° C. versus YSI reference glucose levels.

FIG. 3B shows the glucose signals extrapolated to a designated temperature (22° C.; see the vertical dashed line in FIG. 3A) and plotted against the reference glucose concentrations. The extrapolated glucose signal values were obtained by inputting the designated temperature (22° C.) into the regression equations for each YSI glucose reference sample, resulting in the following three extrapolated values: 65.77, 316.86 and 553.12 (current counts, mV). A line is fitted through the extrapolated values plotted in FIG. 3B and a regression analysis performed to produce a normalization function shown as follows (Eq. (1)):

$$y = 1.0122x - 14.577 \quad (1)$$

where y corresponds to the primary output signal value that may be used as a normalization function value and x corresponds to glucose (analyte) concentration. In this embodiment, the regression equation is a linear function of analyte concentration, but in other embodiments, the regression equation may be a polynomial or other type of function.

Figures 3C, 3D:
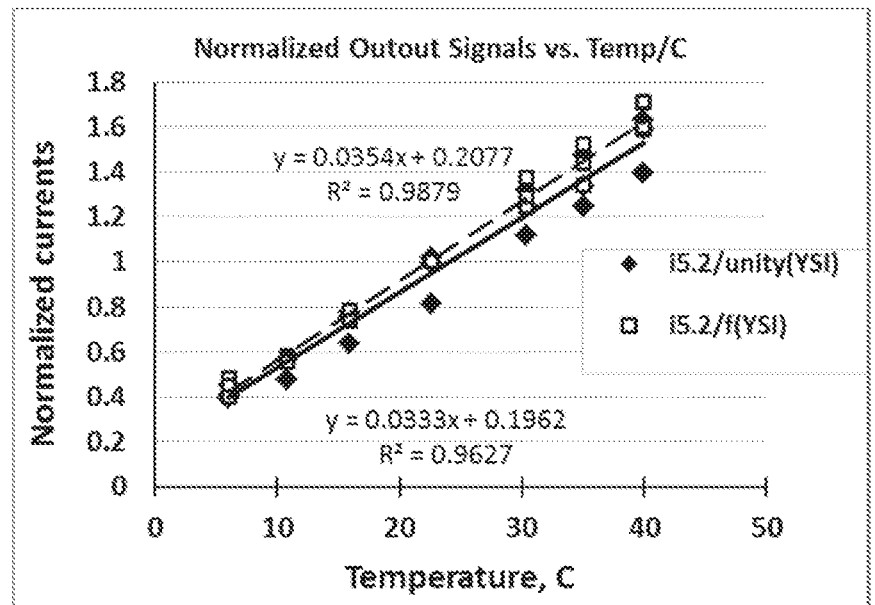
FIG. 3C shows a graph of normalized primary output signal determined by two normalization methods versus temperature.
FIG. 3D shows a table summarizing the estimated accuracy of temperature back-calculated using the normalization functions shown in FIG. 3C.

FIG. 3C plots normalized glucose signals ("Normalized Currents") against temperature ("Temperature, C"), which establishes the correlation between the normalized primary output signals and temperature. FIG. 3C includes normalized glucose signals determined by two different normalization methods. Normalized glucose signals determined as a ratio of the measured glucose signals ($i_{5.2}$) to the unity function value of the known YSI reference glucose concentration value (i.e., a normalization current value taken at the numerical value of the known analyte concentration) are plotted using diamonds (◆). Normalized glucose signals plotted using open squares (□) were determined by dividing the measured glucose signals ($i_{5.2}$) by the normalization function values for the known YSI reference glucose concentration values (x) determined by Eq. (1). A regression analysis of the two normalized glucose signals plotted against temperature in FIG. 3C generates a linear regression function for each as follows:

$$y_{(◆)} = 0.0333 x_{(◆)} + 0.1962 \quad (2)$$

$$y_{(□)} = 0.0354 x_{(□)} + 0.2077 \quad (3)$$

where $y_{(◆)}$ corresponds to the glucose signal normalized by taking a ratio to a unity function of the known YSI reference concentrations and $y_{(□)}$ corresponds to the glucose signal normalized by taking a ratio to the normalization function value (Eq. (1)), and $x_{(◆)}$ and $x_{(□)}$ correspond to temperature. The two plots shown in FIG. 3C and Equations (2) and (3) show the relationship between normalized glucose signals and temperature. Equations (2) and (3) may be rewritten to express temperature as a function of normalized glucose signal as follows:

$$x_{(◆)} = \frac{y_{(◆)} - 0.1962}{0.0333} \quad (4)$$

$$x_{(□)} = \frac{y_{(□)} - 0.2077}{0.0354} \quad (5)$$

The relationship between normalized glucose signals and temperature, as expressed by, for example, Equations (4) or (5), may be used as normalized calibration information to back-calculated temperature (secondary output signal) by normalizing the measured glucose (primary output) signal to the normalization value derived from a corresponding glucose (analyte) concentration and applying the normalized calibration information to the normalized glucose (primary output) signal.

FIG. 3D shows the estimated accuracy of temperatures back-calculated using Equations (4) and (5). The back-calculated temperature ($T_{calc}$) using either Equation (4) or (5) shows no mean bias relative to the measured temperature ($T_{meas}$), that is to say that the mean $\Delta T = T_{calc} - T_{meas}$ is 0.0° C. Both equations show equivalent accuracy as a method of back-calculating temperatures.

Figure 3E:
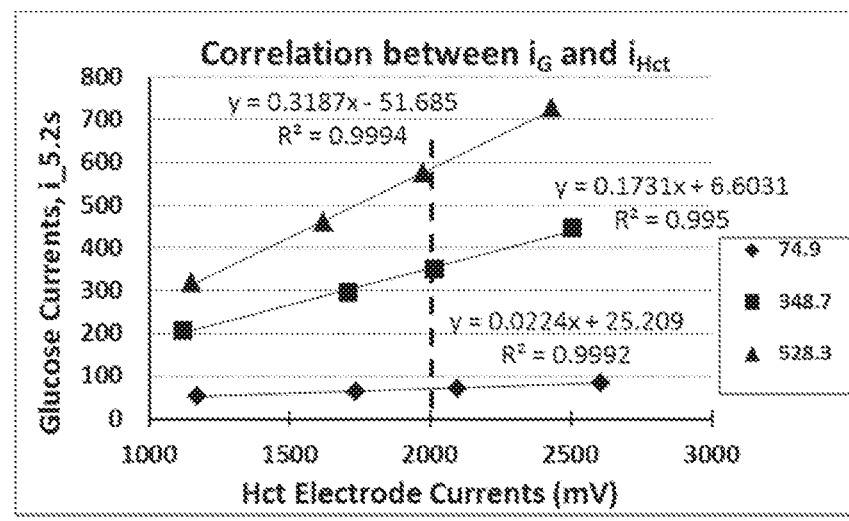
FIG. 3E represents the primary output signals as a function of the Hct signals of the Hct dedicated electrode at three different reference glucose concentrations.
Figure 3F:
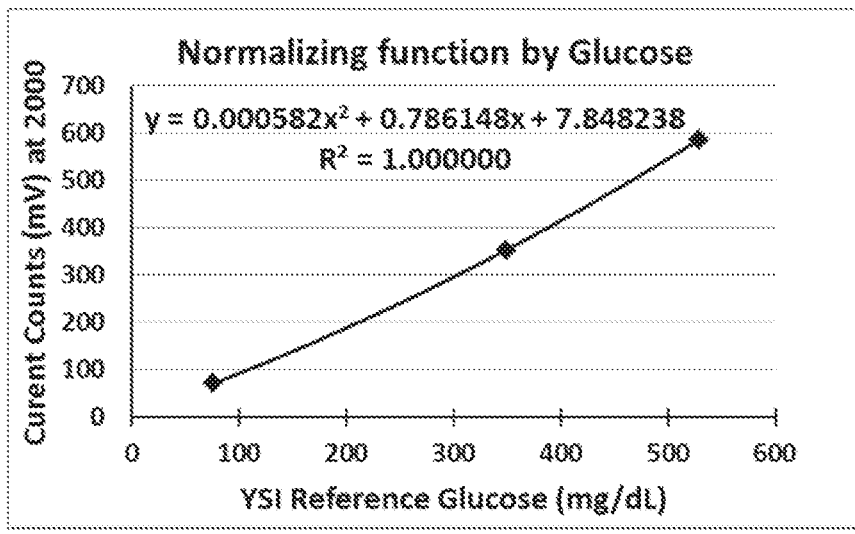
FIG. 3F represents a normalizing function for the Hct signals extrapolated at $i_{Hct}=2000$ mV versus YSI reference glucose levels.
Figure 3G:
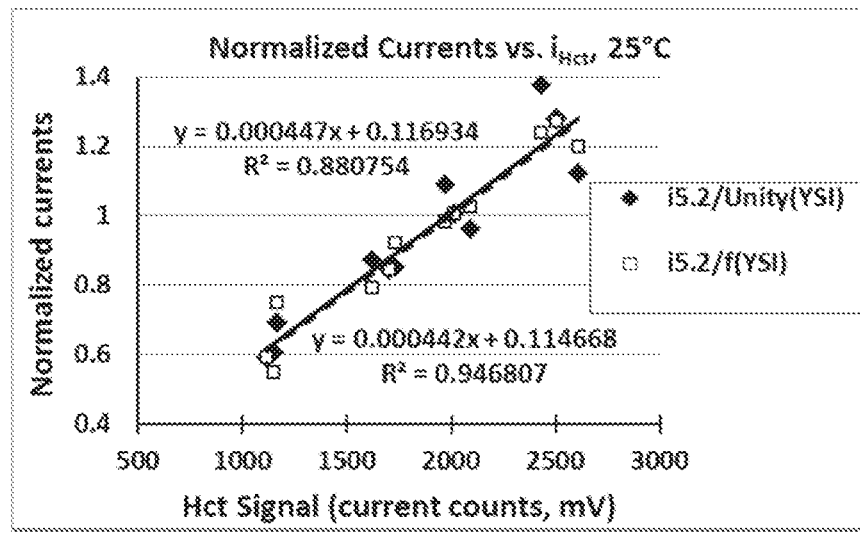
FIG. 3G represents the normalized reference correlation for back-calculating the Hct Signals determined by the normalized output signals.

FIGS. 3E-3G illustrate some aspects of normalization as applied to normalize a primary output signal that is primarily responsive to glucose concentration to be dependent on Hct signal (secondary output signal) only.

FIG. 3E shows a plot of glucose signal ($i_G$, the primary output signal in this example) as a function of Hct signal ($i_{Hct}$, the secondary output signal in this example) at three glucose concentrations. The glucose signals (reported as the ending current at 5.2 seconds in a gated amperometry potential sequence, "Glucose Currents, i_5.2 s") from each of the YSI glucose reference samples (glucose level of 74.9 mg/dL (◆), 348.7 mg/dL (■), and 528.3 mg/dL (▲)) are plotted against the Hct signals as measured by a dedicated Hct electrode ("Hct Electrode Currents (mV)"). Regression equations corresponding to the plotted data for each YSI reference sample are also shown. In the biosensor system used to generate the data shown in FIG. 3E, the expected average Hct current count is 2500 mV for 20% Hct, 2000 mV for 42% Hct, 1680 mV for 60% Hct and 1150 mV for 70% Hct, and both $i_G$ and $i_{Hct}$ decrease with increasing % Hct.

FIG. 3F shows glucose signals extrapolated to a designated value for the Hct Electrode Current (2000 mV; see vertical dashed line in FIG. 3E) and plotted against the YSI reference glucose levels (mg/dL). The extrapolated glucose signal values were obtained by inputting the designated Hct signal value (2000 mV) into the regression equation for each YSI reference glucose sample, resulting in the following three extrapolated values: 70.01, 352.8 and 585.7. A line is fitted through the extrapolated values plotted in FIG. 3F and a regression analysis performed to produce a normalization function shown as follows (Eq. (6)):

$$y=0.000582x^2+0.786148x+7.848238 \quad (6)$$

where y corresponds to the glucose signal value that may be used as a normalization function value and x corresponds to glucose (analyte) concentration.

FIG. 3G plots normalized glucose signals ("Normalized currents") against Hct signal (mV), which establishes the correlation between the normalized glucose signals and Hct signal. FIG. 3G includes normalized glucose signals determined by two different normalization methods. Normalized glucose signals determined as a ratio of the measured glucose signal ($i_{5.2}$) to the unity function value of the known YSI reference glucose concentration (i.e., a normalization current value taken at the numerical value of the known analyte concentration) are plotted using diamonds (◆). Normalized glucose signals plotted using open squares (□) were determined by dividing the measured glucose signal ($i_{5.2}$) by the normalization function values for the known analyte concentration values (x) determined by Eq. (6). A regression analysis of the two normalized glucose signals plotted against Hct signal in FIG. 3G generates a linear regression function for each as follows:

$$y_{(◆)}=0.000447x_{(◆)}+0.116934 \quad (7)$$

$$y_{(□)}=0.000442x_{(□)}+0.114668 \quad (8)$$

where $y_{(◆)}$ corresponds to the normalized glucose signal obtained by taking a ratio of the glucose signal to unity function of the known YSI reference concentrations and $y_{(□)}$ corresponds to the normalized glucose signal obtained by taking a ratio of the glucose signal to the normalization function value (Eq. (6)), and $x_{(□)}$ and $x_{(◆)}$ correspond to Hct signal. The two plots shown in FIG. 3G and Equations (7) and (8) show the relationship between normalized glucose signals and Hct signal. Equations (7) and (8) may be rewritten to express Hct signal as a function of normalized glucose signal and used as normalized calibration information to back-calculate Hct (secondary output) signal by inputting the normalized measured glucose (primary output) signal corresponding to a glucose (analyte) concentration.

Figure 3H:
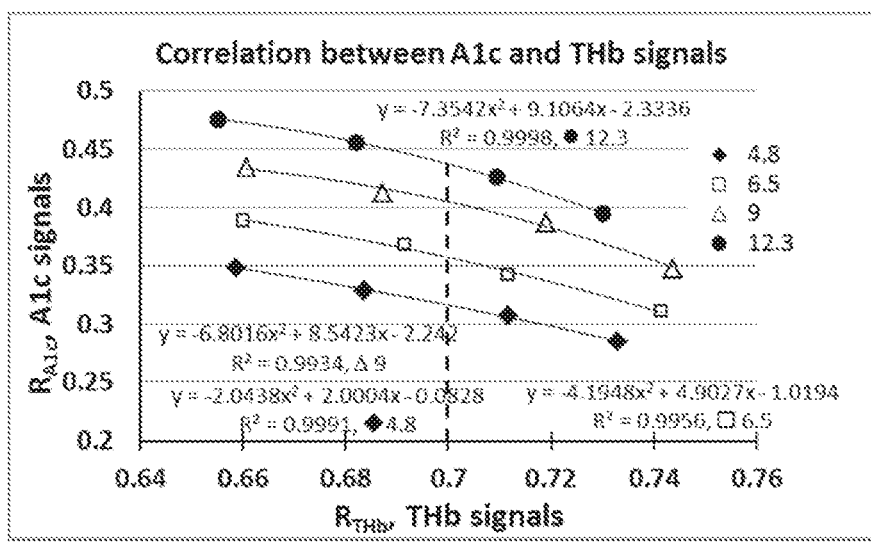
FIG. 3H represents the primary A1c signals (reflectance) as a function of the THb signals from a dedicated detection channel at four different reference %-A1c concentrations.
Figure 3I:
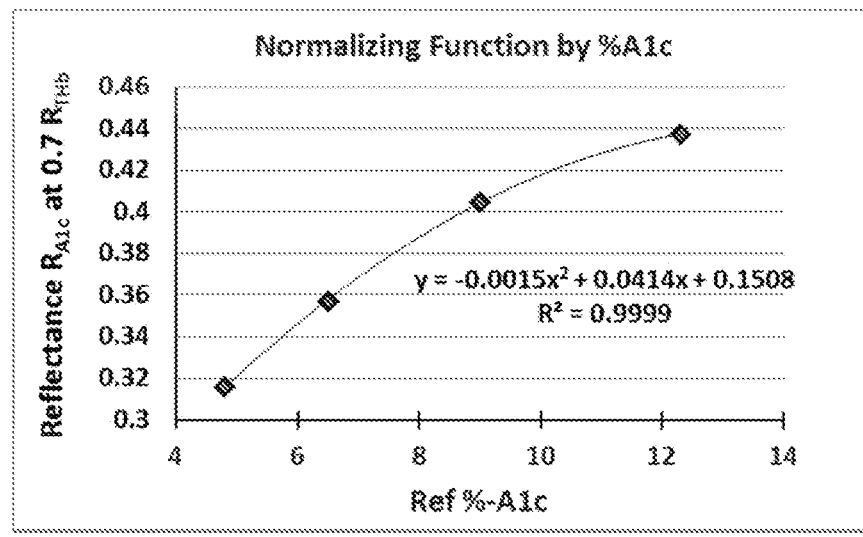
FIG. 3I represents a normalizing function for the THb signals extrapolated at $R_{THb}=0.7$ versus reference %-A1c levels.
Figure 3J:
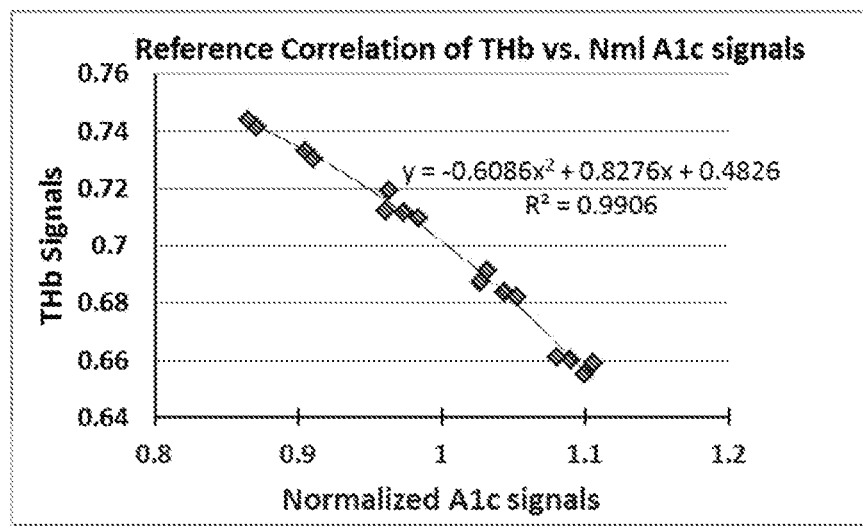
FIG. 3J represents the normalized reference correlation for back-calculating the THb signals where the THb signal is plotted against the normalized A1c signals.

FIGS. 3H-3J illustrate some aspects of normalization as applied to normalize a primary output signal that is primarily responsive to %-A1c level to be dependent on THb signal (secondary output signal) only.

FIG. 3H shows a plot of Mc signals ($R_{A1c}$, the primary output signal in this example) as a function of THb signal ($R_{THb}$, the secondary output signal in this example) at four %-A1c levels. The A1c signals (reported as reflectance of a first wavelength measured from a first detection zone using a laminar flow A1c biosensor system) from each of the reference samples (% A1c level of 4.8 (◆), 6.5 (□), 9 (Δ) and 12.3 (●)) are plotted against THb signals (measured as reflectance of a second wavelength from a second detection zone). Curves are fitted through data from each reference sample, and regression equations corresponding to each curve are also shown.

FIG. 3I shows the A1c signals extrapolated to a THb reflectance signal ($R_{THb}$) value of 0.7, which corresponds to an average THb concentration (~150 mg/mL) (see vertical dashed line in FIG. 3H), plotted against the reference %-A1c level. The extrapolated A1c signal values were obtained by inputting the $R_{THb}$ designated value (0.7) into the regression equation for each %-A1c reference sample, resulting in the following four extrapolated values: 0.31602, 0.35704, 0.40483 and 0.43732. A regression analysis of the extrapolated A1c signal data plotted in FIG. 3I generates the normalization function (Eq. (9)):

$$y=-0.0015x^2+0.0414x+0.1508 \quad (9)$$

where y corresponds to the A1c signal value that may be used as a normalization function value and x corresponds to %-A1c level (analyte concentration). In this example, the regression equation (Eq. (9)) is a second order polynomial function of analyte concentration. FIG. 3J plots THb signals values against the normalized A1c signals, which establishes the correlation between THb signals and normalized A1c signals. The normalized A1c signals plotted in FIG. 3J were determined as a ratio of the measured A1c signal to the normalization function value for the known analyte concentration values (x) determined by Eq. (9). A regression analysis of the THb signals plotted against normalized A1c signals in FIG. 3J generates a second order polynomial regression function as follows:

$$y=-0.6086x^2+0.8276x+0.4826 \quad (10)$$

where y corresponds to THb signal and x corresponds to the normalized A1c signal. Equation (10) may be used as normalized calibration information to back-calculate a THb (secondary output) signal by inputting the normalized measured A1c (primary output) signal corresponding to %-A1c (analyte concentration).

FIG. 3K summarizes some steps for one embodiment of generating a normalization function and normalized calibration information that may be used to back-calculate a secondary output signal in accordance with the present disclosure. In implementing the steps shown in flow chart 300, a biosensor system is used to measure reference primary output signals from a plurality of reference samples at step 301. The reference primary output signals are primarily responsive to a primary stimulus, and each reference sample is associated with a known value of the primary stimulus. At step 302, the biosensor system generates a secondary output signal for each measured reference primary output signal. The generated secondary output signal is responsive to an extraneous stimulus that affects the measured reference primary output signal. Steps 301 and 302 may be performed in any order, or may occur simultaneously.

At step 303, the measured reference primary output signals for each reference sample (from step 301) are correlated to the generated secondary output signals (from step 302). In some implementations, a regression analysis may be performed on the correlated data from step 303 to generate a regression equation that relates measured reference primary output signal to generated secondary output signal.

At step 304, for each reference sample, a reference primary output signal value is extrapolated to a designated value of the secondary output signal. The designated value of the secondary output signal is typically a value around the mid-point of the range of generated secondary output signals (from step 302); however, any value within the range of generated secondary output signals may be used as the designated value to which a reference primary output signal value is extrapolated. In implementations that generate the first regression equation that relates measured reference primary output signal to generated secondary output signal, the first regression equation may be used to extrapolate the reference primary output signal value by inputting the designated value of the secondary output signal.

At step 305, the extrapolated reference primary output signal values (from step 304) are correlated to their known primary stimulus values in order to generate a normalization function by, for example, regression analysis of the correlated data.

The normalization function is then used, at step 306, to normalize each measured reference primary output signal at its corresponding known primary stimulus value. Normalization is typically carried out by dividing the measured primary output signal by a normalization function value. In this embodiment, the normalization function value is determined by inputting the known primary stimulus value into the normalization function generated at step 305.

At step 307, the normalized reference primary output signals (from step 306) are correlated to the generated secondary output signals (from step 302) to generate normalized calibration information. This normalized calibration information may be used in some embodiments of the present disclosure in order to back-calculate a secondary output signal based on the measured primary output signal. In some implementations, the normalized calibration information may be represented as a regression equation that relates normalized primary output signals to secondary output signals and results from a regression analysis of the correlated data from step 307.

Figure 4A:
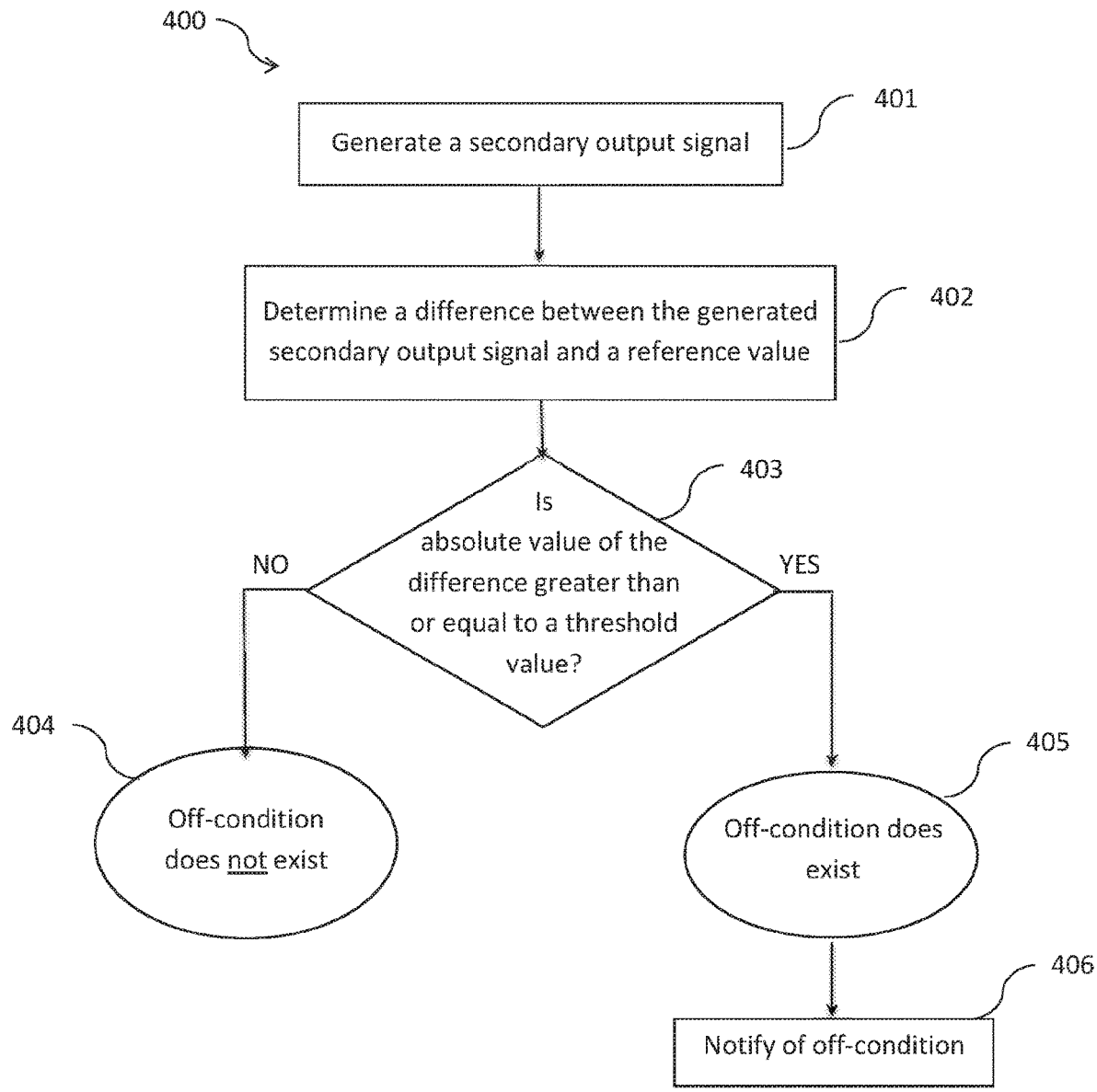
FIG. 4A represents one embodiment of a method of determining an off-condition in an analyte concentration determination.

FIGS. 4A-4B illustrate different embodiments to determine whether an off-condition exists. The flow chart 400 in FIG. 4A illustrates some steps in determining whether an off-condition exists based on a difference between the generated secondary output signal and a reference value for the extraneous stimulus established during calibration of the biosensor system. For example, the standard reference correlation of the primary output signal to analyte concentration is typically established at a reference temperature (such as 25° C.) and a reference hematocrit level (such as 42%). For biosensor measurements at a temperature or hematocrit level that differ from the reference value, the effect of temperature or hematocrit on the primary output signal is typically compensated by the conversion function so that the analyte concentration is reported at the reference temperature and hematocrit level values. However, if the difference between the generated secondary output signal and the reference value is too large, an off-condition may exist and the typical compensation methods may introduce additional error into the analyte determination.

In implementing the steps shown in the flow chart 400, a biosensor system generates a secondary output signal at step 401 and determines a difference between the generated secondary output signal and a reference value at step 402. Step 403 queries whether the absolute value of the difference determined at step 402 is greater than or equal to a threshold value. In implementations where repeated cycles are carried out, a difference between an $n^{th}$ adjusted secondary output signal, or an $n^{th}$ back-calculated secondary output signal, and a reference value may be determined, and an off-condition may exist when the absolute value of this difference is greater than or equal to the threshold value. The threshold value is typically set depending on the sensitivity desired for detecting an off-condition, and may be varied (for example, progressively reduced) from one cycle to the next. If the query of step 403 returns "NO", then an off-condition does not exist (as shown at 404). If the query of step 403 returns "YES", then an off-condition does exist (as shown at 405), and, in some implementations, a notification of the off-condition may be provided at step 406. The notification may take any form, for example, a warning message on a display incorporated with the biosensor system, a red light indicator on the biosensor system indicating that an error may exist, and the like. The notification may also include instructions for correcting the off-condition or to repeat the measurement.

The flow chart 410 of FIG. 4B illustrates some steps in determining whether an off-condition exists based on a difference between the generated secondary output signal and an expected extraneous stimulus value based on the measured primary output signal. At steps 411 and 412, a biosensor system measures a primary output signal and generates a secondary output signal. Steps 411 and 412 may be performed in any order, or may occur simultaneously. At step 413, a back-calculated secondary output signal is determined based on the measured primary output signal; the back-calculated secondary output signal reflects the expected extraneous stimulus value based on the measured output signal. At step 414, a difference between the generated secondary output signal from step 412 and the back-calculated secondary output signal from step 413 is determined. Step 415 queries whether the absolute value of the difference determined at step 414 is greater than or equal to a preset value. In implementations where repeated cycles are carried out, a difference between an $n^{th}$ back-calculated secondary output signal and an $(n-1)^{th}$ back-calculated, or $(n-1)^{th}$ adjusted, secondary output signal and may be determined, and an off-condition may exist when the absolute value of this difference is greater than or equal to the preset value. The preset value is typically set depending on the sensitivity desired for detecting an off-condition, and may be varied (for example, progressively reduced) from one cycle to the next. If the query of step 415 returns "NO", then an off-condition does not exist (as shown at 416). If the query of step 415 returns "YES", then an off-condition does exist (as shown at 418); in some implementations, a notification of the off-condition (as discussed previously, with regard to step 406 in FIG. 4A) may be provided at step 419.

In some implementations according to the present disclosure, an off-condition may be determined based on a combination of the criteria discussed with regard to FIGS. 4A and 4B. That is, an off-condition may be determined to exist when the absolute value of the difference between the generated secondary output signal and the reference value is greater than or equal to a threshold value, and the absolute value of the difference between the generated secondary output signal and the back-calculated secondary output signal is greater than or equal to a preset value.

Figure 5A:
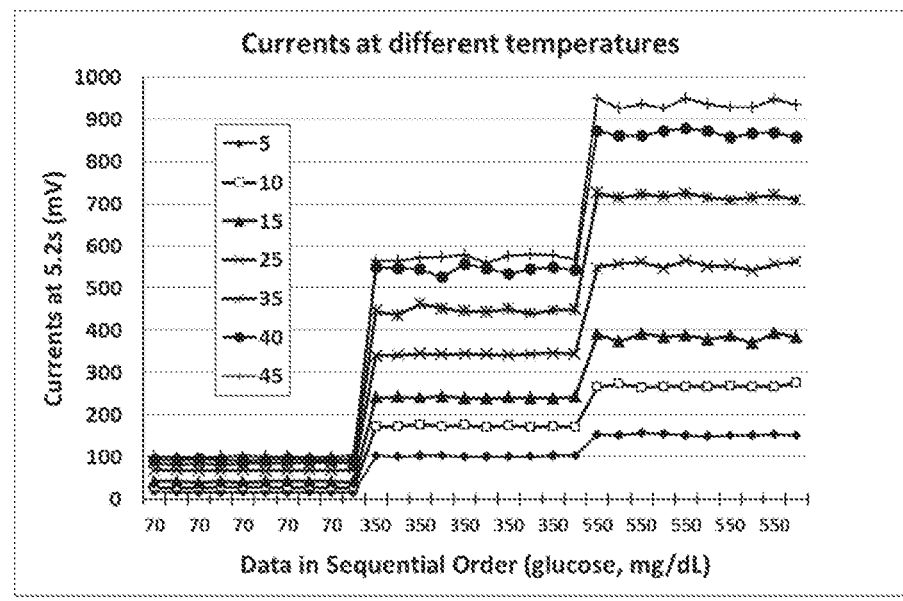
FIG. 5A shows a plot of measured primary output signals for three different whole blood (WB) glucose concentrations taken with the sensor/sample and meter at seven different temperatures.
Figure 5B:
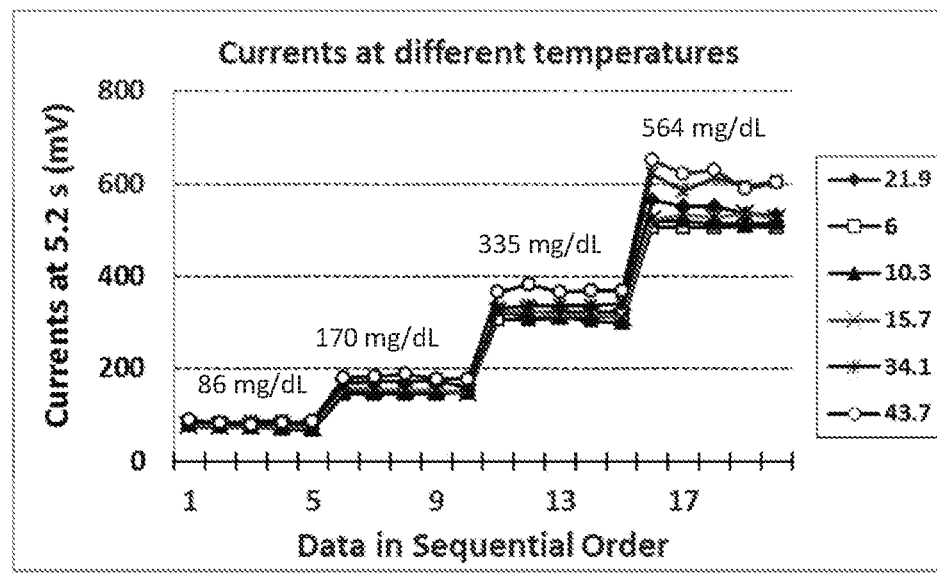
FIG. 5B shows a plot of measured primary output signals for four different WB glucose concentrations taken with the sensor/sample at 22° C. and the meter at six different temperatures.
Figure 5C:
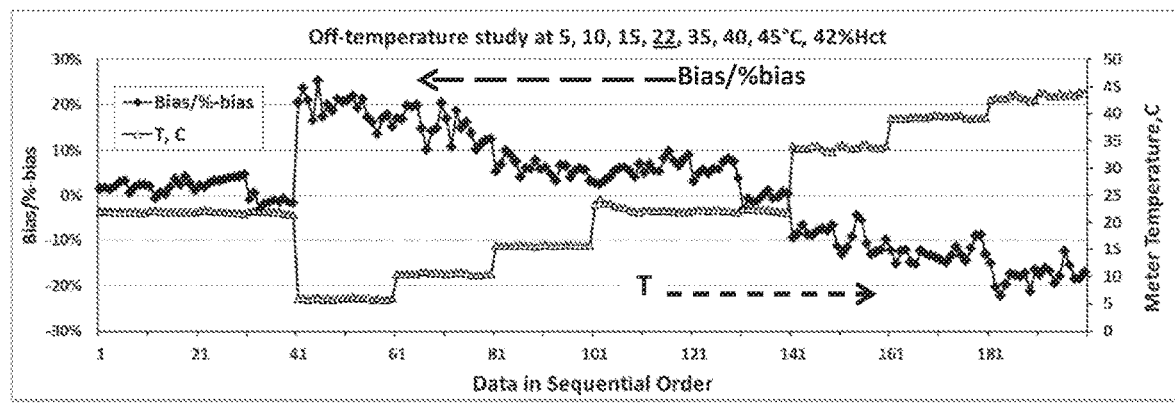
FIG. 5C shows a plot of bias/%-bias in an analyte determination using a conventional one-way conversion function with temperature compensation in an off-temperature condition and the meter temperature at which the primary output signals were measured.

The error introduced into an analyte measurement by an off-condition may be illustrated by FIGS. 5A-5C, which illustrate the effect of an "off-temperature condition." An off-temperature condition may occur, for example, when a hand-held meter is kept in a car during winter weather (e.g., 0°-10° C.) or summer weather (e.g., 40°-45° C.) and then used with a test sensor that had been kept at room temperature (e.g., 22°-25° C.). Given that heat transfer between the test sensor and the meter through the interfacing contacts is expected to be minimal within a short time, the test sensor/sample temperature is expected to remain relatively unchanged, regardless of the meter temperature.

When a temperature sensor or other temperature measuring device is incorporated into a biosensor system, it is assumed that the temperature measured by such device accurately reflects the temperature of the test sensor and of the sample, but such devices are typically incorporated into the meter, not the sensor. Methods that include temperature compensation for determining analyte concentration typically use the temperature measured by such devices to compensate the primary output signal. Under an off-temperature condition, however, the measured temperature may not accurately reflect the sensor/sample temperature, so temperature compensated measurements using the measured temperature will introduce error into the calculated analyte concentration.

FIG. 5A shows a plot of primary output signal (Currents at 5.2 s (mV)) from samples with three different glucose concentrations (70, 350 and 550 mg/dL) as measured by a biosensor system at seven temperatures, with the meter and sensor/sample at the same temperature: 5° C. (♦), 10° C. (□), 15° C. (▲), 25° C. (x), 35° C. (*), 40° C. (●) and 45° C. (+). The measured primary output signals at different glucose concentrations varied with temperature, with the variance increasing as the concentration increases. Conversion functions including temperature compensation, such as that discussed in U.S. Pat. No. 7,781,222 ("Temperature-Adjusted Analyte Determination for Biosensor System"), have been developed to compensate for such temperature-related variances in primary output signals when converting the primary output signal into an analyte concentration.

FIG. 5B shows a plot of primary output signal (Current at 5.2 s (mV)) from samples with four different glucose concentrations (86, 170, 335 and 564 mg/dL) as measured by a biosensor system with the sensor/sample at ~22° C. and the meter stored at six different temperatures (22° C., 5° C., 10° C., 15° C., 35° C., 45° C.) resulting in average temperature measurements as follows: 21.9° C. (♦), 6° C. (□), 10.3° C. (▲), 15.7° C. (x), 34.1° C. (*) and 43.7° C. (○). Even though the measured meter temperatures vary greatly, the sensor/sample temperature remains relatively stable, as reflected in the measured primary output signals remaining relatively unchanged for each glucose concentration. If a conversion function with temperature compensation is applied to these data using the measured meter temperature to compensate for the effect of temperature, the measured meter temperature would introduce a potentially large error into the analyte determination.

FIG. 5C shows the error in glucose concentration (plotted as bias/%-bias) for data in FIG. 5B determined using a conventional conversion function with temperature compensation due to an off-temperature condition, when the measured meter temperature does not accurately represent the sensor/sample temperature. The bias/%-bias data (♦) are plotted sequentially along with the average meter temperatures (Δ) at 22° C., 5.5° C., 10.5° C., 15.5° C., 22.5° C., 34° C., 39.5° C., and 43.5° C. (the sensor/sample were at ~22° C.). As can be seen in FIG. 5C, the larger the difference between the sensor/sample and the measured meter temperature, the larger the error in the analyte concentration.

Figure 6A:
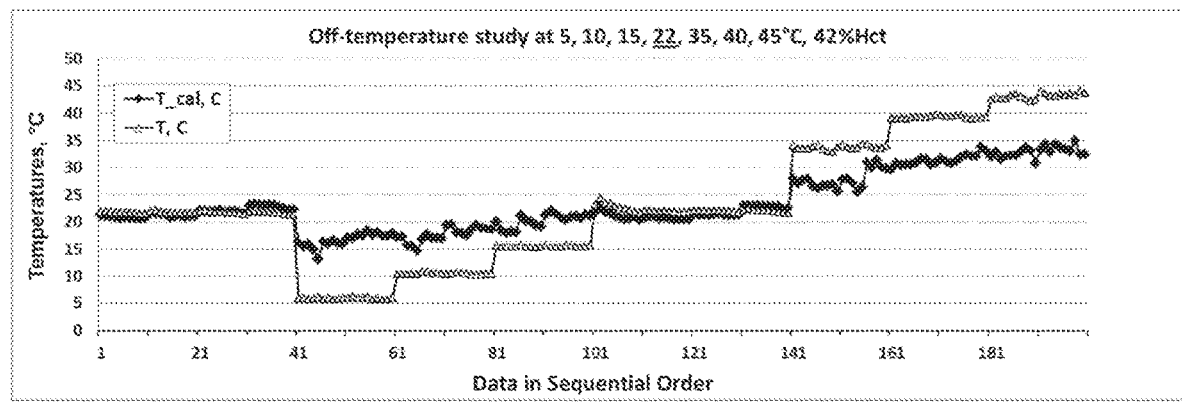
FIG. 6A shows a plot of back-calculated temperatures based on a measured primary output signal and the meter temperature at which the primary output signals were measured.

Using a back-calculated temperature in the compensation, rather than the measured temperature, may help alleviate such error due to an off-temperature condition. Such a back-calculated temperature better reflects the temperature of the sample under the actual measurement conditions. FIG. 6A shows back-calculated temperatures based on the primary output signals measured under off-temperature conditions (sensor/sample temperature at ~22° C.; average meter temperatures at 22° C., 5.5° C., 10.5° C., 15.5° C., 22.5° C., 34° C., 39.5° C., and 43.5° C.). The back-calculated temperatures (♦) shown in FIG. 6A were generated from the same data as the bias/%-bias data shown in FIG. 5C, using the normalizing calibration information embodied by Equation (4), above (see also FIG. 3C and accompanying text). These back-calculated temperatures are shown to be closer to the sensor/sample temperature of ~22° C. than the measured meter temperatures (Δ). Furthermore, inputting the back-calculated temperatures into the same standard conversion function with temperature compensation that was used to generate the data shown in FIG. 5C produces more accurate analyte concentration determinations with reduced error (smaller bias/%-bias), as shown in FIG. 6B.

Figure 6B:
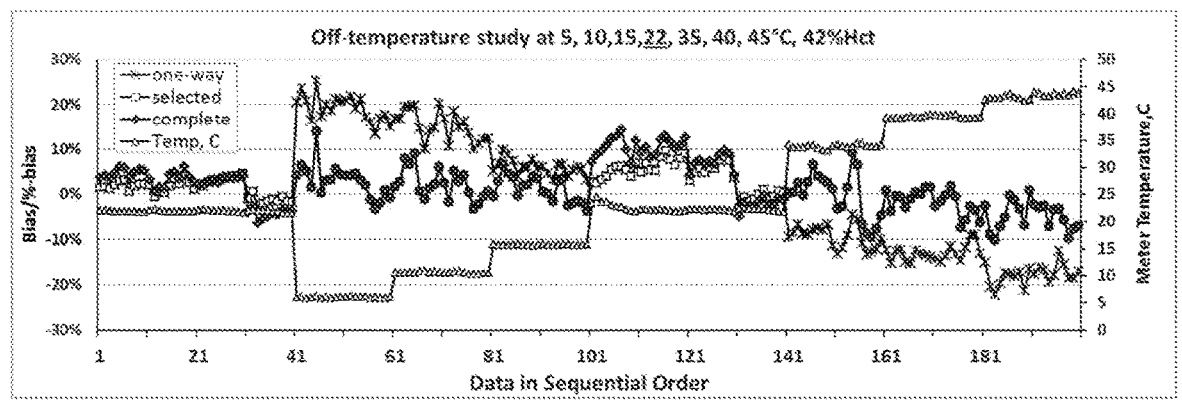
FIG. 6B shows a plot of bias/%-bias in an analyte determination using a conventional (one-way) application of a conversion function with temperature compensation (*), a complete one cycle application of the conversion function with temperature compensation (♦), and a selected one cycle application of the conversion function with temperature compensation applied in off-temperature conditions only (□), and the meter temperature at which the primary output signals were measured.

FIG. 6B shows the error in glucose concentration (plotted as bias/%-bias) determined using a one-way application of a conventional conversion function with temperature compensation as shown in FIG. 1A (x) (this is the same data shown in FIG. 5C), a complete one cycle application of the same conventional conversion function with back-calculated temperature for compensation (♦) (as outlined in FIG. 2A), and a selected one cycle application of the same conventional conversion function with back-calculated temperature for compensation applied only when an off-temperature condition is detected (□) (as outlined in FIG. 2B), plotted along with the average measured meter temperature (Δ). Back-calculated temperatures were determined were determined using the normalizing calibration information embodied by Equation (4), above (see also FIG. 3C and accompanying text). During off-temperature conditions, the complete and selected one cycle applications both reduced the error in terms of bias/%-bias on average from ~20% down to ~10% compared to the results of the conventional one-way application; at more extreme off-temperature conditions, such as at an average measured meter temperature ~5° C., the error is reduced from ~20% to ~5%. When applied during no off-temperature conditions (e.g., measured meter temperature ~22° C.), the one cycle application had comparable error of ~10% as the conventional one-way approach; but applying compensation only during off-temperature conditions, as done in the selected one cycle application minimized the chance of producing unnecessary biases.

Figure 7B:
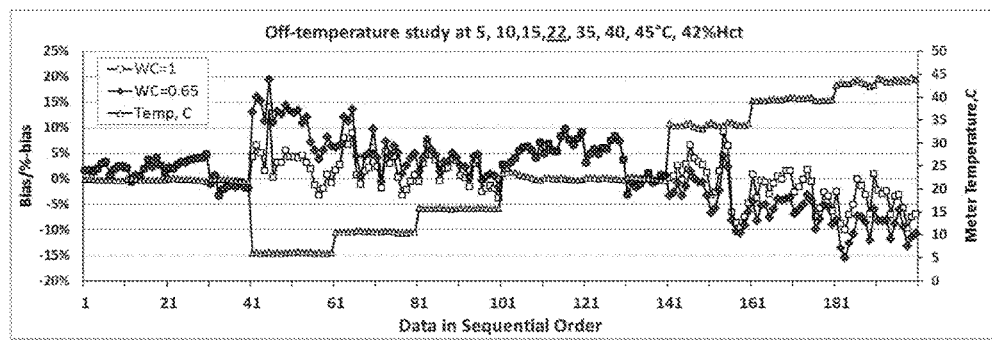
FIG. 7B shows a plot of bias/%-bias in an analyte determination using a cyclic application of a conversion function with temperature compensation with two different weight coefficients.

FIGS. 7A-7B illustrate some steps and results from some embodiments of a method of compensating an analyte measurement in an off-temperature condition, using a cyclic compensation approach according to the present disclosure.

The embodiment of a cyclic compensation process shown in FIG. 7A includes the steps of back-calculating temperature based on a previously determined analyte concentration, determining a temperature difference between the back-calculated temperature and the temperature used for compensation in the previously determined analyte concentration, detecting an off-temperature condition using the determined temperature difference, and, if an off-temperature condition is detected, adjusting the temperature and re-calculating an analyte concentration using the adjusted temperature to compensate for the effect of temperature on the measured primary output signal; the process is repeated until no off-temperature condition is detected, at which point the determined analyte concentration is reported as the analyte measurement.

More specifically, in the flowchart 700 shown in FIG. 7A, the process begins at step 701, with a biosensor system measuring a primary output signal. At step 702, a temperature measurement ($T^0$) is generated using the biosensor system (the superscript "0" used with "T" herein designates the temperature measurement made using the biosensor system, regardless of any subscript that may be appended to "T"). Steps 701 and 702 may be performed in any order, or may occur simultaneously. At step 703, the measured primary output signal is converted into a preliminary analyte concentration ($G^0$) using a conversion function with the temperature measurement ($T^0$) to compensate for the effect of temperature on the measured primary output signal.

In the embodiment shown in FIG. 7A, an initial determination of whether an off-temperature condition may exist occurs at step 704. The initial determination in this embodiment is based on whether the absolute value of a difference between the temperature measurement ($T^0$) and a reference temperature ($T_{ref}$) is greater than or equal to a threshold value. For example, if the threshold value is set at 7° C., then an off-temperature condition may exist when $|T^0 - T_{ref}| \geq 7°$ C. If an off-temperature condition is determined to possibly exist at this initial query (i.e., the query at step 704 returns "YES"), then the cyclic compensation process may proceed (as discussed further below). If, however, the initial query at step 704 returns "NO", then no off-temperature condition may exist and the process may proceed directly to step 709 where the preliminary analyte concentration ($G^0$) may be reported as the analyte measurement. The threshold value may be set at any value (e.g., 10, 7, 5, 3, 2, or 1° C.) depending on the sensitivity desired for detecting an off-temperature condition.

The cyclic compensation process shown in FIG. 7A may take more than one cycle, so a counter (n) is used to track each cycle and is set to n=1 at step 705.

At step 706, an $n^{th}$ back-calculated temperature ($T^n$) is determined based on the $(n-1)^{th}$ analyte concentration ($G^{n-1}$). In other words, an $n^{th}$ back-calculated temperature ($T^n$) is determined as a function of the $(n-1)^{th}$ analyte concentration, i.e., $T^n = f(G^{n-1})$.

At step 707, an $n^{th}$ temperature difference ($\Delta T^n$) is determined as follows:

$$\Delta T^n = T^n - T^{n-1}_{adj} \quad (11)$$

where $T^n$ is the $n^{th}$ back-calculated temperature (from step 706) and, for n=1, $T^{n-1}_{adj}$ is the temperature measurement ($T^0$) generated by biosensor system at step 702.

An off-temperature condition is detected by querying at step 708 whether the absolute value of the $n^{th}$ temperature difference is greater than or equal to a preset value, i.e., $|\Delta T^n| \geq$ preset value. For example, if the preset value is set at 5° C., then an off-temperature condition would be detected when $|\Delta T^n| \geq 5°$ C., that is when the $n^{th}$ back-calculated temperature ($T^n$) differs from the previously adjusted temperature ($T^{n-1}_{adj}$) by 5° C. or more. The preset value may be set at any value (e.g., 10, 7, 5, 3, 2, or 1° C.) depending on the sensitivity desired for detecting an off-temperature condition; it also may be set to progressively decrease, for example, with each cycle, or the like.

If no off-temperature condition is detected based on the $n^{th}$ temperature difference, ($\Delta T^n$) (i.e., the query of 708 returns "NO"), then the $(n-1)^{th}$ analyte concentration ($G^{n-1}$) is reported by the biosensor system as the analyte measurement at step 709.

If an off-temperature condition is detected based on $n^{th}$ temperature difference, ($\Delta T^n$) (i.e., the query of 708 returns "YES"), then an $n^{th}$ adjusted temperature ($T^n_{adj}$) is determined at step 710 as follows:

$$T^n_{adj} = T^{n-1}_{adj} + WC\Delta T^n \quad (12)$$

where, for n=1, $T^{n-1}_{adj}$ is the temperature measurement ($T^0$) generated by biosensor system at step 702, $\Delta T^n$ is the $n^{th}$ temperature difference (from step 707), and WC is a weighting coefficient that may be any value from zero (0) up to and including one (1). The weighting coefficient (WC) is used to determine how much of the $n^{th}$ back-calculated temperature ($T^n$) to use to adjust the previously adjusted temperature ($T^{n-1}_{adj}$). When WC=1, then the $n^{th}$ back-calculated temperature ($T^n$) completely replaces the previously adjusted temperature, so that $T^n_{adj} = T^n$.

At step 711, an $n^{th}$ analyte concentration ($G^n$) is determined by converting the measured primary output signal (from step 701) using the conversion function with the $n^{th}$ adjusted temperature ($T^n_{adj}$, from step 710) to compensate for the effect of temperature on the measured primary output signal. The counter, n, is advanced by one (i.e., n=n+1) at step 712, and another cycle started at step 706. The cycle of steps 706-712 may be repeated until the query at 708 returns "NO" and an off-temperature condition is not detected based on the $n^{th}$ temperature difference ($\Delta T^n$), at which point the $(n-1)^{th}$ analyte concentration ($G^{n-1}$) is reported by the biosensor system as the analyte measurement at step 709.

FIG. 7B illustrate the effect of WC on a cyclic temperature compensation process applied for one cycle of steps 706-711 according to the implementation shown in FIG. 7A. FIG. 7B plots the error in terms of bias/%-bias from a one cycle application of the conversion function with temperature compensation using the back-calculated temperature to fully compensate for the effect of temperature (i.e., WC=1) (□) and a one cycle application of the conversion function with temperature compensation using a portion of the back-calculated temperature to partially compensate for the effect of temperature (i.e., WC=0.65) (♦), plotted along with the average measured meter temperature (Δ). Compared to the error from a conventional one-way application of a standard conversion function with temperature compensation (see FIG. 6B, one-way data plotted using (x)), the system error is reduced from ~20% to ~5% using WC=1 and to ~15% using WC=0.65 at more extreme off-temperature conditions (e.g., measured meter temperature at ~5° C.). Using the back-calculated temperature to fully compensate for the effect of temperature (WC=1) may in some instances overcompensate for the effect of temperature, for example, at less extreme off-temperature conditions (e.g., measured meter temperature at ~35° C.); thus, in some instances, it may be desirable to use WC<1 to compensate for the effect of an extraneous stimulus in a more gradual manner.

Table 1 below shows data generated using an embodiment of a cyclic compensation method similar to that shown in the flowchart 700 of FIG. 7A to compensate the temperature effect in an analyte determination during an off-temperature condition. The data in Table 1 were generated using a biosensor system, three YSI reference glucose samples (glucose concentration levels of 85.9, 169.8 and 84.0 mg/dL) and sensors stored at ~22° C. and meters stored at 5° C., 22° C. and 40° C. The back-calculated temperatures ($T^n$) were determined using the normalizing calibration information embodied by Equation (4), above (see also FIG. 3C and accompanying text). The weighting coefficient (WC) was set equal to 1 (i.e., WC=1) so that $T^n_{adj} = T^n$.

TABLE 1

Summary of cyclic compensation process for $T^n_{adj}$ and $G^n$

| YSI | $T^0$ | $G^0$ | bias/%-bias | $T^0 - T_{ref}$ | Initial Off-T Y/N?[a] |
|---|---|---|---|---|---|
| — | 85.9 | 21.9 | 87.4 | 1.6% | −3.1 | N |
| — | 169.8 | 5.7 | 201.5 | 18.7% | −19.3 | Y |
| — | 84.0 | 39.0 | 68.8 | −15.2% | 14.1 | Y |

| n | YSI | $T^{n-1}_{adj}$ | $G^{n-1}$ | $T^n$ | $\Delta T^n$ | Off-T Y/N? | $T^n_{adj}$ | $G^n$ | bias/%-bias |
|---|---|---|---|---|---|---|---|---|---|
| 1 | 85.9 | 21.9 | 87.4 | 20.5 | −1.4 | N[b] | — | — | — |
| 1 | 169.8 | 5.7 | 201.5 | 16.7 | 11.0 | Y[b] | 16.7 | 175.2 | 3.2% |
| 1 | 84.0 | 39.0 | 68.8 | 30.8 | −8.2 | Y[b] | 30.8 | 80.2 | −4.5% |
| 2 | 85.9 | 21.9 | — | — | — | — | — | — | — |
| 2 | 169.8 | 16.7 | 175.2 | 19.9 | 3.2 | N[b], Y[c] | 19.9 | 172.0[b] | 1.3%[b] |
| 2 | 84.0 | 30.8 | 80.2 | 25.9 | −4.9 | N[b], Y[c] | 25.9 | 88.7[b] | 5.6%[b] |
| 3 | 85.9 | 21.9 | — | — | — | — | — | — | — |
| 3 | 169.8 | 19.9 | 172.0[b] | 20.3 | 0.4 | N[c], N[d] | 20.3 | — | — |
| 3 | 84.0 | 25.9 | 88.7[b] | 23.0 | −2.9 | N[c], Y[d] | 23.0 | 93.8[c] | 9.8%[c] |
| 4 | 85.9 | 21.9 | — | — | — | — | — | — | — |
| 4 | 169.8 | 20.3 | — | — | — | — | — | — | — |
| 4 | 84.0 | 23.0 | 93.8[c] | 21.5 | −1.5 | N[d] | 21.5 | — | — |

Notes:
$T^0$ = temperature measurement
$G^0$ = preliminary analyte concentration (=f($T^0$))
$T_{ref}$ = 25° C.
$T^n$ = $n^{th}$ back-calculated temperature (=f($G^{n-1}$))
$\Delta T^n = T^n - T^{n-1}_{adj}$
[a]Initial off-T criterion: $|T^0 - T_{ref}| \geq 7°$ C. (threshold value)
[b]Off-T criterion: $|\Delta T^n| \geq 5°$ C. (preset value)
[c]Off-T criterion: $|\Delta T^n| \geq 3°$ C. (preset value)
[d]Off-T criterion: $|\Delta T^n| \geq 2°$ C. (preset value)
$T^n_{adj}$ = $n^{th}$ adjusted temperature (here WC = 1, therefore $T^n_{adj} = T^n$)
$G^n$ = f($T^n_{adj}$)
bias/%-bias = ($G^n$ − YSI)/YSI As shown in FIG. 7A, the process begins with a biosensor system measuring a primary output signal and generating a temperature measurement ($T^0$). A preliminary glucose concentration ($G^0$) is determined using the temperature measurement ($T^0$) to compensate for the effect of temperature on the measured primary output signal. As seen in Table 1, the preliminary analyte concentrations at measured meter temperatures ($T^0$) of 5.7 and 39.1° C. for YSI samples having glucose concentration levels of 169.8 and 84.0 mg/dL, respectively, have bias/%-biases larger than ±10%. Applying the initial criterion of $|T^0 - T_{ref}| \geq 7°$ C. (threshold value), an off-temperature condition may exist for YSI samples having glucose concentration levels of 169.8 and 84.0 mg/dL, but an off-temperature condition does not exist for the YSI sample having a glucose concentration of 85.9 mg/dL with a measured meter temperature of 21.9° C., so no cyclic compensation may be necessary for this sample measurement. In some embodiments, such as the one shown in FIG. 7A, if the initial off-temperature criterion is not met, then no cyclic compensation is applied and back-calculating a temperature is not necessary. For purposes of illustrating a second off-temperature criterion based on a back-calculated temperature, the data shown in Table 1 includes a first back-calculated temperature and $|\Delta T^n|$ calculated for the YSI sample having a glucose concentration of 85.9 mg/dL for which no off-temperature condition was detected based on the initial criterion.

A first back-calculated temperature ($T^1$, for n=1) is determined based on the preliminary analyte concentration ($G^0$). Applying the criterion of $|\Delta T^1 = T^1 - T^0| \geq 5°$ C. (preset value), no off-temperature condition is detected for the YSI sample having a glucose concentration of 85.9 mg/dL with a measured meter temperature of 21.9° C., therefore no cyclic compensation is performed on this sample measurement. An off-temperature condition is detected for YSI samples having glucose concentration levels of 169.8 and 84.0 mg/dL, so for these two YSI samples, a first adjusted temperature ($T^1_{adj}$) is calculated (using WC=1, so that $T^1_{adj}=T^1$) and cycled as an input to determine a first analyte concentration ($G^1$). Compared to the preliminary analyte concentration of these two YSI samples, the error in the first analyte concentration ($G^1$) has been reduced to within ±5%.

For n=2, a second back-calculated temperature ($T^2$) is determined based on the first analyte concentration ($G^1$). If the preset value is kept the same, so that the same criterion of $|\Delta T^n| \geq 5°$ C. is applied, then no off-temperature condition is detected for these YSI samples (169.8 and 84.0 mg glucose/dL) and no further cyclic compensation is performed. However, if the preset value is reduced and a criterion of $|\Delta T^n| \geq 3°$ C. is applied, then an off-temperature condition is detected for both of these YSI samples, and a second adjusted temperature ($T^2_{adj}$) is calculated (using WC=1, so that $T^2_{adj}=T^2$) and cycled as an input to determine a second analyte concentration ($G^2$). The error in the second analyte concentration ($G^2$) for these two YSI samples remains less than ±10%, so within presently acceptable performance limits. Additionally, the second back-calculated temperature values ($T^2$) are closer to the expected value of the meter temperature (~22° C.) than the first back-calculated temperatures ($T^1$).

For n=3, a third back-calculated temperature ($T^3$) is determined based on the second analyte concentration ($G^2$) for these two YSI samples (169.8 and 84.0 mg glucose/dL). Applying the criterion of $|\Delta T^n| \geq 3°$ C., no off-temperature condition is detected for either sample, so no further cyclic compensation is performed. If desired, for example, to drive the back-calculated temperature closer to the sample/sensor temperature, the preset value may be reduced further, for example, a criterion of $|\Delta T''| \geq 2°$ C. is applied. With the preset value set at 2° C., an off-temperature condition is detected for the YSI sample having 84.0 mg glucose/dL, and another cycle of compensation applied to this sample measurement, with a third adjusted temperature $(T^3_{adj})$ calculated (using WC=1, so that $T^3_{adj}=T^3$) and cycled as an input to determine a third analyte concentration $(G^3)$.

For n=4, a fourth back-calculated temperature $(T^4)$ is determined based on the third analyte concentration $(G^3)$ for the YSI sample having 84.0 mg glucose/dL. Applying the criterion of $|\Delta T''| \geq 2°$ C., no off-temperature condition is detected, so no further cyclic compensation is performed. As can be seen in Table 1, the fourth back-calculated temperature $(T^4)$ is even closer to the expected meter temperature than any of the previously back-calculated temperatures.

Reviewing the data in Table 1, it can be seen that repeated cyclic compensation, particularly used in conjunction with progressively reducing the preset value and refining the off-temperature criterion, may be used to gradually drive the back-calculated temperature to the expected sensor/sample temperature. Progressively reducing the preset value, however, does not necessarily result in a concomitant progressive reduction in the error in the analyte concentration as other error sources may become more expressed. However, the error in the analyte concentration remains within presently acceptable performance limits (e.g., ±10%).

Table 2 below shows data generated using an embodiment of a cyclic compensation method similar to that shown in flowchart 240 of FIG. 2D to compensate the hematocrit effect in an analyte determination. In this embodiment, after an initial determination that an off-condition exists based on $|i_{Hct\_Ref} - i^0_{Hct}| \geq 300$ (threshold value) and $|\Delta i^1_{Hct} = i^1_{Hct} - i^0_{Hct}| \geq 300$ (preset value), the cyclic compensation process was carried out for a pre-determined number of cycles, in this case N=9. The data in Table 2 were generated from a YSI reference sample having a glucose concentration level of 245 mg/dL and 38% Hct, using a biosensor system having a dedicated Hct electrode. The first line of data includes the data generated directly from the biosensor measurement $(i^0_{Hct}, G^0)$. The back-calculated hematocrit signals $(i''_{Hct})$ were determined using the normalizing calibration information embodied by Equation (8), above (see also FIG. 3G and accompanying text) and were used in calculating the $n^{th}$ analyte concentration (i.e., $G'' = f(i''_{Hct})$). In order to monitor the progress of the cyclic compensation, the off-condition criteria and bias/%-bias were calculated for each cycle.

The generated Hct signal $(i^0_{Hct} = 791.5$ mV) is low compared to the reference value $(i_{Hct\_Ref} = 2000$ mV, so $|i_{Hct\_Ref} - i^0_{Hct}| = 1208.5$ mV) and also low compared to the first back-calculated Hct signal $(i^1_{Hct} = 1271.8$ mV, so $|\Delta i^1_{Hct} = i^1_{Hct} - i^1_{Hct}| = 480.3$ mV), which indicate an off-condition exists. The preliminary glucose concentration $(G^0)$ has a %-bias of 38.3%. The data in Table 2 show that after 9 cycles of compensation using the back-calculated Hct signal, the %-bias in glucose concentration is reduced to less than 10%.

TABLE 2

Summary of cyclic compensation process for $i''_{Hct}$ and $G''$

| n | YSI | % Hct | $i^0_{Hct}$ | $G^0$ (bias/%-bias) | $i_{Hct-ref} - i^0_{Hct}$ | $i''_{Hct}$ | $G''$ (bias/%-bias) | $i_{Hct-ref} - i''_{Hct}$ | $\Delta i''_{Hct}$ |
|---|---|---|---|---|---|---|---|---|---|
| 1 | 245 | 38 | 791.5 | 338.2 (38.5%) | 1208.5 | 1271.8 | 329.1 (34.6%) | 728.2 | 480.3 |
| 2 | — | — | — | — | — | 1321.1 | 319.6 (30.7%) | 678.9 | 49.3 |
| 3 | — | — | — | — | — | 1376.4 | 309.7 (26.7%) | 623.6 | 55.2 |
| 4 | — | — | — | — | — | 1436.9 | 299.8 (22.6%) | 563.1 | 60.5 |
| 5 | — | — | — | — | — | 1501.5 | 290.2 (18.7%) | 498.5 | 64.7 |
| 6 | — | — | — | — | — | 1568.5 | 281.6 (15.2%) | 431.5 | 67.0 |
| 7 | — | — | — | — | — | 1632.3 | 274.6 (12.3%) | 367.7 | 63.8 |
| 8 | — | — | — | — | — | 1687.6 | 268.8 (9.9%) | 312.4 | 55.3 |
| 9 | — | — | — | — | — | 1735.6 | 263.9 (7.9%) | 264.4 | 48.0 |

Notes:
$i^0_{Hct}$ = generated Hct signal
$G^0$ = preliminary analyte concentration $(= f(i^0_{Hct}))$
$i_{Hct-ref} = 2000$
$i''_{Hct} = n^{th}$ back-calculated Hct signal $(= f(G^{n-1}))$
$\Delta i''_{Hct} = i''_{Hct} - i^{n-1}_{Hct}$
$G'' = f(i''_{Hct})$
bias/%-bias = $(G'' - YSI)/YSI$
Off-T criteria: $|i_{Hct-ref} - i''_{Hct}| \geq 300$ (threshold value) and $|\Delta i''_{Hct}| \geq 300$ (preset value)

Figure 8:
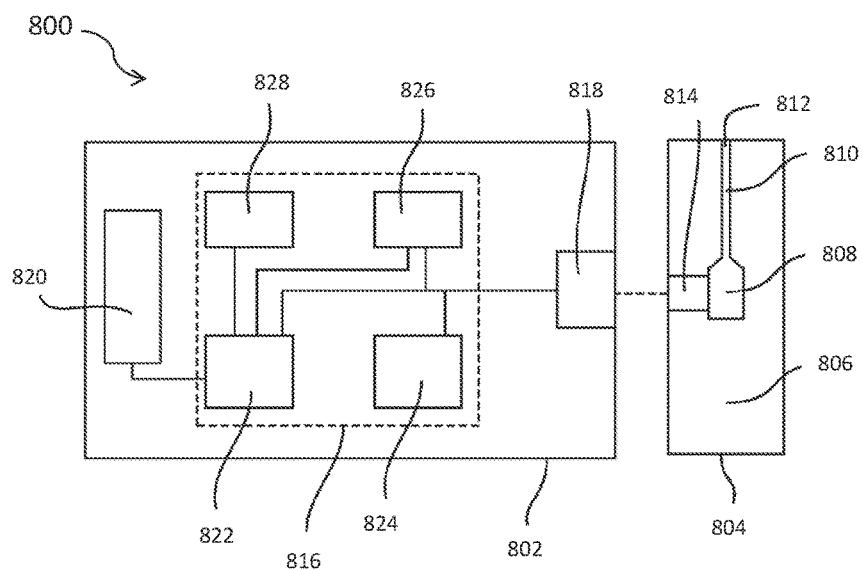
FIG. 8 represents one embodiment of a biosensor system according to the present disclosure.

The methods of the present disclosure that may be implemented may be in an electrochemical biosensor system, an optical system, a combination thereof, or the like. FIG. 8 depicts a schematic representation of one embodiment of a biosensor system 800 in which the methods of the present disclosure may be implemented. The biosensor system 800 includes a measurement device 802 and a test sensor 804. The measurement device 802 may be implemented in an analytical instrument, including a bench-top device, a portable or hand-held device, or the like.

The biosensor system 800 typically determines the analyte concentration of the sample using calibration information stored in the measurement device 802. The biosensor system 800 may be utilized to determine analyte concentrations, including those of glucose, A1c, uric acid, lactate, cholesterol, bilirubin, and the like. While a particular configuration is shown, the biosensor system 800 may have other configurations and may include additional components.

The test sensor 804 typically has a base 806 that forms a reservoir 808 and a channel 810 with an opening 812. The reservoir 808 and the channel 810 may be covered by a lid with a vent. The reservoir 808 defines a partially-enclosed volume and may contain a composition that assists in retaining a liquid sample such as water-swellable polymers or porous polymer matrices. Reagents may be deposited in the reservoir 808 and/or the channel 810. The reagents may include one or more enzymes, binders, mediators, and like species, and/or a chemical indicator. The test sensor 804 has a sample interface 814 adjacent to the reservoir 808. The test sensor 804 may have other configurations.

In an electrochemical system, the sample interface 814 has conductors or contacts electrically connected to a working electrode (not shown) and a counter electrode (not shown) from which the output signal may be measured. The sample interface 814 also may include conductors or contacts electrically connected to one or more additional electrodes (not shown) from which secondary output signals may be measured. The electrodes may be substantially in the same plane or in more than one plane. The electrodes may be disposed on a surface of the base 806 that forms the reservoir 808. The electrodes may extend or project into the reservoir 808. A dielectric layer may partially cover the conductors and/or the electrodes. The sample interface 814 may have other electrodes and conductors and contacts.

In an optical sensor system, the sample interface 814 typically has one or more optical portals or apertures for probing the sample with light.

The measurement device 802 includes electrical circuitry 816 connected to a sensor interface 818 and an optional display 820. The electrical circuitry 816 includes a processor 822 connected to a signal generator 824, a temperature sensor 826, and a storage medium 828.

The signal generator 824 is capable of providing an electrical input signal to the sensor interface 818 in response to the processor 822. In an optical system, the electrical input signal may be used to operate or control the detector and light source in the sensor interface 818. In an electrochemical system, the electrical input signal may be transmitted via the sensor interface 818 to the sample interface 814 to apply the electrical input signal to the sample of the biological fluid. The electrical input signal may be a potential or current and may be constant, variable, or a combination thereof, such as when an AC signal is applied with a DC signal offset. The electrical input signal may be applied continuously or as multiple excitations, sequences, or cycles. The signal generator 824 also may be capable of recording an output signal from the sensor interface as a generator-recorder.

The temperature sensor 826 is capable of measuring the ambient temperature of the measurement device 802, and may be a thermister, thermometer, or other temperature sensing device.

The storage medium 828 may be a magnetic, optical, or semiconductor memory, another storage device, or the like. The storage medium 828 may be a fixed memory device, a removable memory device, such as a memory card, remotely accessed, or the like. The storage medium 828 may store the computer-programmed instructions and calibration and other information used in the analyte measurement, analysis and/or methods of the present disclosure (such as threshold values and the preset values used to detect an off-condition).

The storage medium 828 also may store a normalization function and/or normalized calibration information that may be used to back-calculate a secondary output signal from a measured primary output signal according to the methods of the present disclosure. Such a normalization function and/or normalized calibration information may be represented graphically, for example as shown in FIGS. 3B-3C, 3F-3G and 3I-3J, or mathematically, for example as shown in Equations (1)-(5), (6)-(8) and (9)-(10), or as a combination thereof, or the like. The normalization function and normalized calibration information are preferably represented as equations, which may be represented by a program number (PNA) table, another look-up table, or the like.

The processor 822 is configured to execute computer-programmed instructions to implement the analyte measurement and analysis including the methods of the present disclosure. The processor 822 also may be configured to interact with the signal generator 824 to, for example, provide the electrical input signal to the sensor interface 818; with the temperature sensor 826 to, for example, generate and receive a temperature measurement ($T^o$); and with the sensor interface 818 to, for example, receive a primary and/or other secondary output signal(s) from the test sensor 804.

In an electrochemical system, the primary output signal is measured using the working and counter electrodes in response to the reaction of the analyte in the sample. Secondary output signals also may be measured from additional electrodes. In optical systems, the detector or detectors of the sensor interface 818 may receive the primary and some secondary output signals.

The processor 822 may be further configured to execute computer-programmed instructions to start the analyte measurement and analysis (including the methods of this disclosure) in response to the presence of the test sensor 804 at the sensor interface 818, the application of a sample to the test sensor 804, user input, or the like. The results of the analyte analysis may be outputted to the display 820, a remote receiver (not shown), and/or may be stored in the storage medium 828.

Instructions to implement an analyte measurement, which may include determining an off-condition, back-calculating a secondary output signal based on a measured primary output signal, and/or cyclic compensation methods, may be provided by the computer readable software code stored in the storage medium 828. The code may be object code or any other code describing or controlling the described functionality. The data from the analyte analysis may be subjected to one or more data treatments, including the determination of decay rates, K constants, ratios, functions, and the like in the processor 822.

The foregoing description has been presented for the purpose of illustrating certain aspects of the present disclosure and is not intended to limit the disclosure. Persons skilled in the relevant art will appreciate that many additions, modifications, variations and improvements may be implemented in light of the above teachings and still fall within the scope of the present disclosure.

I claim:

1. A method of determining an analyte concentration in a biological fluid sample with a measuring device, the method comprising:
measuring a primary electrical output signal from a sensor interface of the measuring device, the biological fluid sample in a reservoir of a test sensor, the primary electrical output signal being primarily responsive to the analyte concentration in the biological fluid sample;
generating a secondary electrical output signal from an extraneous stimulus sensor of the measuring device,
wherein the secondary electrical output signal is a measurement value of an extraneous stimulus affecting the primary electrical output signal,
wherein the extraneous stimulus is quantifiable from the secondary electrical output signal, and
wherein the extraneous stimulus affecting the primary electrical output signal is one of a temperature, a hematocrit (Hct), or a total hemoglobin (Thb);
detecting that an off-condition exists based on a difference between the secondary electrical output signal and a reference value;
responsive to detecting that the off-condition exists, back-calculating a back-calculated secondary electrical output signal based on the primary electrical output signal via a processor of the measuring device,
wherein the back-calculated secondary electrical output signal is an adjusted measurement value of the extraneous stimulus affecting the primary electrical output signal, and
wherein the extraneous stimulus is quantifiable from the back-calculated secondary electrical output signal;
adjusting the secondary electrical output signal using the back-calculated secondary electrical output signal to derive an adjusted secondary electrical output signal, wherein the adjusted secondary electrical output signal has a different value than the back-calculated secondary electrical output signal;
converting the primary electrical output signal to the analyte concentration using a conversion function with the adjusted secondary electrical output signal to compensate for the effect of the extraneous stimulus on the primary electrical output signal via the processor; and
displaying the analyte concentration on a display of the measuring device.

2. The method of claim 1, wherein the generated secondary electrical output signal is measured separately from the measured primary electrical output signal.

3. The method of claim 1, wherein back-calculating of the back-calculated secondary electrical output signal based on the primary output signal comprises:
converting the primary electrical output signal to a preliminary analyte concentration using the conversion function with the secondary electrical output signal to compensate for the effect of the extraneous stimulus on the primary electrical output signal;
normalizing the primary electrical output signal relative to the preliminary analyte concentration to derive a normalized electrical output signal; and
applying normalized calibration information to the normalized electrical primary output signal, the normalized calibration information relating the normalized primary electrical output signal to the secondary electrical output signal.

4. The method of claim 1, wherein adjusting the secondary electrical output signal comprises:
determining a difference by subtracting the secondary electrical output signal from the back-calculated secondary electrical output signal;
determining an adjustment amount by multiplying the difference with a weighting coefficient, wherein the weighting coefficient is a positive number not greater than 1;
adding the adjustment amount to the secondary electrical output signal; and
repeating the steps of determining the difference, determining the adjustment amount, and adding the adjustment amount to the secondary electrical output signal until the off-condition is not detected.

5. The method of claim 1, wherein the secondary electrical output signal is generated from the primary electrical output signal.

6. The method of claim 1, wherein the reference value is one of a reference temperature value, a reference hematocrit value, or a reference total hemoglobin value.

7. A method of determining an analyte concentration in a biological fluid sample with a measuring device, the method comprising:
measuring a primary electrical output signal from a sensor interface of the measuring device, the biological fluid sample in a reservoir of a test sensor, the primary electrical output signal being primarily responsive to the analyte concentration in the biological fluid sample;
generating a secondary electrical output signal from an extraneous stimulus sensor of the measuring device,
wherein the secondary electrical output signal is a measurement value of an extraneous stimulus affecting the primary electrical output signal,
wherein the extraneous stimulus is quantifiable from the secondary electrical output signal, and
wherein the extraneous stimulus affecting the primary electrical output signal is one of a temperature, a hematocrit (Hct), or a total hemoglobin (Thb);
detecting that an off-condition exists based on a first difference between the secondary electrical output signal and a reference value;
responsive to detecting that the off-condition exists, back-calculating a back-calculated secondary electrical output signal based on the primary electrical output signal via a processor of the measuring device,
wherein the back-calculated secondary electrical output signal is an adjusted measurement value of the extraneous stimulus affecting the primary electrical output signal, and
wherein the extraneous stimulus is quantifiable from the back-calculated secondary electrical output signal;
determining a second difference by subtracting the secondary electrical output signal from the back-calculated secondary electrical output signal;
determining an adjustment amount by multiplying the second difference with a weighting coefficient, wherein the weighting coefficient is a positive number not greater than 1;
adding the adjustment amount to the secondary electrical output signal to determine an adjusted secondary electrical output signal;
converting the primary electrical output signal to the analyte concentration using a conversion function with the adjusted secondary electrical output signal to compensate for the effect of the extraneous stimulus on the primary electrical output signal via the processor; and displaying the analyte concentration on a display of the measuring device.

8. The method of claim 7,
wherein back-calculating the secondary electrical output signal comprises using a correlation between the secondary electrical output signal and a normalized primary electrical output signal, and
wherein the normalized primary electrical output signal is normalized to be dependent on one of: temperature, hematocrit (Hct), or total hemoglobin (THb).

9. The method of claim 7, further comprising:
responsive to detecting that the off-condition does not exist:
   converting the primary electrical output signal to the analyte concentration; and
   displaying the analyte concentration on the display of the measuring device.

10. A biosensor system for determining an analyte concentration in a biological fluid sample, the biosensor system comprising:
a test sensor having a base and a sample interface,
the base having formed therein a reservoir for receiving the biological fluid sample, and
the sample interface being disposed adjacent to the reservoir; and
a measuring device configured to interface with the test sensor and having a sensor interface, a storage medium and a processor, the processor being connected with the sensor interface and the storage medium and being configured to execute computer-programmed instructions to:
   receive, via the sensor interface, a measured primary electrical output signal measured from the biological fluid sample in the reservoir, the measured primary electrical output signal being primarily responsive to the analyte concentration;
   receive a generated secondary electrical output signal, the generated secondary electrical output signal being responsive to an extraneous stimulus affecting the measured primary electrical output signal,
   wherein the generated secondary electrical output signal is a measurement value of the extraneous stimulus affecting the measured primary electrical output signal,
   wherein the extraneous stimulus is quantifiable from the generated secondary electrical output signal, and
   wherein the extraneous stimulus affecting the measured primary electrical output signal is one of a temperature, a hematocrit (Hct), or a total hemoglobin (Thb);
   detect that an off-condition exists based on a difference between the generated secondary electrical output signal and a reference value;
   responsive to detecting that the off-condition exists, back-calculate a back-calculated secondary electrical output signal based on the measured primary electrical output signal,
   wherein the back-calculated secondary electrical output signal is an adjusted measurement value of the extraneous stimulus affecting the measured primary electrical output signal, and
   wherein the extraneous stimulus is quantifiable from the back-calculated secondary electrical output signal;
   adjust the generated secondary electrical output signal using the back-calculated secondary electrical output signal to derive an adjusted generated secondary electrical output signal,
   wherein the adjusted generated secondary electrical output signal has a different value than the back-calculated secondary electrical output signal; and
   convert the measured primary electrical output signal to the analyte concentration using a conversion function that is stored in the storage medium, wherein the conversion function uses the adjusted generated secondary electrical output signal to compensate for the effect of extraneous stimulus on the measured primary electrical output signal.

11. A biosensor system for determining an analyte concentration in a biological fluid sample in an off-condition, the biosensor system comprising:
a test sensor having a base and a sample interface,
the base having formed therein a reservoir for receiving the biological fluid sample, and
the sample interface being disposed adjacent to the reservoir; and
a measuring device configured to interface with the test sensor and having a sensor interface, a storage medium and a processor, the processor being connected with the sensor interface and the storage medium and being configured to execute computer-programmed instructions to:
   receive, via the sensor interface, a measured primary electrical output signal measured from the biological fluid sample in the reservoir, the measured primary electrical output signal being primarily responsive to the analyte concentration;
   receive a generated secondary electrical output signal, the generated secondary electrical output signal being responsive to an extraneous stimulus affecting the measured primary electrical output signal,
   wherein the generated secondary electrical output signal is a measurement value of the extraneous stimulus affecting the measured primary electrical output signal,
   wherein the extraneous stimulus is quantifiable from the generated secondary electrical output signal, and
   wherein the extraneous stimulus affecting the measured primary electrical output signal is one of a temperature, a hematocrit (Hct), or a total hemoglobin (Thb);
   back-calculate a back-calculated secondary electrical output signal based on the measured primary electrical output signal
   wherein the back-calculated secondary electrical output signal is an adjusted measurement value of the extraneous stimulus affecting the measured primary electrical output signal, and
   wherein the extraneous stimulus is quantifiable from the back-calculated secondary electrical output signal;
   determine whether the off-condition exists based on a difference between the generated secondary electrical output signal and a reference value; and
   if the off-condition exists;
      adjust the generated secondary electrical output signal using the back-calculated secondary electrical output signal to derive an adjusted generated secondary electrical output signal, wherein the adjusted generated secondary electrical output signal has a different value than the back-calculated secondary electrical output signal; and
      convert the measured primary electrical output signal to the analyte concentration using a conversion function and the adjusted generated secondary electrical output signal to compensate for the effect of the extraneous stimulus.

* * * * *